United States Patent
He et al.

(10) Patent No.: US 12,110,438 B2
(45) Date of Patent: *Oct. 8, 2024

(54) LIQUID CRYSTAL COMPOSITION CONTAINING DIBENZO DERIVATIVES AND LIQUID CRYSTAL DISPLAY DEVICE

(71) Applicant: Jiangsu Hecheng Display Technology Co., Ltd., Nanjing (CN)

(72) Inventors: Di He, Nanjing (CN); Wenquan Ding, Nanjing (CN); Haibin Xu, Nanjing (CN); Shuang Xu, Nanjing (CN); Huijuan Dai, Nanjing (CN); Lifang Yao, Nanjing (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/012,683

(22) PCT Filed: Jun. 25, 2021

(86) PCT No.: PCT/CN2021/102328
§ 371 (c)(1),
(2) Date: Dec. 23, 2022

(87) PCT Pub. No.: WO2022/001863
PCT Pub. Date: Jan. 6, 2022

(65) Prior Publication Data
US 2023/0257654 A1    Aug. 17, 2023

(30) Foreign Application Priority Data
Jun. 28, 2020 (CN) .......................... 202010596444.1

(51) Int. Cl.
*C09K 19/34* (2006.01)
*G02F 1/1343* (2006.01)
*G02F 1/137* (2006.01)

(52) U.S. Cl.
CPC ...... *C09K 19/3491* (2013.01); *C09K 19/3405* (2013.01); *C09K 2019/3408* (2013.01); *G02F 1/134363* (2013.01); *G02F 1/13712* (2021.01)

(58) Field of Classification Search
CPC ........................................... C09K 19/34
See application file for complete search history.

(56) References Cited

U.S. PATENT DOCUMENTS

| | | | | |
|---|---|---|---|---|
| 11,827,829 B2 * | 11/2023 | Yao | ................. | C09K 19/18 |
| 2018/0112132 A1 * | 4/2018 | Li | ................. | C07D 307/91 |
| 2019/0345129 A1 * | 11/2019 | Li | ................. | C09K 19/068 |
| 2020/0032143 A1 * | 1/2020 | Takata | ................. | G02F 1/13 |

FOREIGN PATENT DOCUMENTS

| | | | | |
|---|---|---|---|---|
| CN | 107973766 A | | 4/2018 | |
| CN | 111117656 A | | 5/2018 | |
| CN | 110343531 A | | 10/2019 | |
| CN | 108264498 A | | 11/2019 | |
| CN | 110300746 A | | 1/2022 | |
| JP | 2019077792 A | * | 5/2019 | |
| JP | 2019147859 A | * | 9/2019 | |
| TW | 201837024 A | | 10/2018 | |
| TW | 201925435 A | | 5/2020 | |
| WO | WO-2018155340 A1 | * | 8/2018 | ........... C07D 307/91 |

* cited by examiner

*Primary Examiner* — Chanceity N Robinson
(74) *Attorney, Agent, or Firm* — Hoffmann & Baron, LLP

(57) ABSTRACT

A liquid crystal composition containing dibenzo derivatives for use in a liquid crystal display device includes at least one compound of general formula I and at least one compound of general formula II.

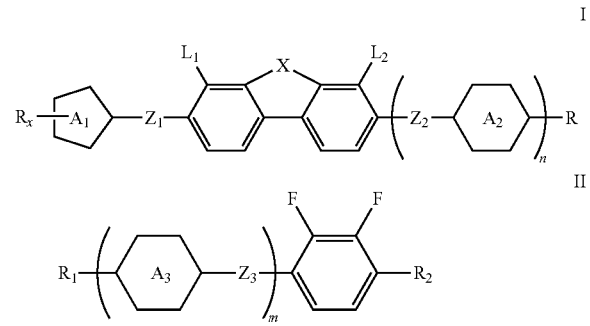

14 Claims, No Drawings

LIQUID CRYSTAL COMPOSITION CONTAINING DIBENZO DERIVATIVES AND LIQUID CRYSTAL DISPLAY DEVICE

CROSS-REFERENCE TO RELATED APPLICATIONS

This application is the National Stage of International Application No. PCT/CN2021/102328, filed Jun. 25, 2021, which claims the benefit of Netherlands Application No. 202010596444.1, filed Jun. 28, 2020, the contents of which is incorporated by reference herein.

TECHNICAL FIELD

The present application belongs to the technical field of liquid crystal display materials, and relates to a liquid crystal composition containing a dibenzo derivative and a liquid crystal display device.

BACKGROUND ARTS

The liquid crystal display (LCD) has been rapidly developed because of its small size, light weight, low power consumption, and excellent display quality, and thus has been widely applied especially in portable electronic information products. According to the type of display mode, liquid crystal displays can be divided into the following types: PC (phase change PC), TN (twist nematic), STN (super twisted nematic), ECB (electrically controlled birefringence), OCB (optically compensated bend), IPS (in plane switching), FFS (fringe field switching), VA (vertical alignment), and PSA (polymer stable alignment), etc.

Among these modes, it is known that the IPS mode, FFS mode, and VA mode can improve the shortcoming of narrow viewing angle of action modes for the TN mode, STN mode and the like. Liquid crystal displays of these display modes mainly use liquid crystal compositions having negative dielectric anisotropy. In order to further improve the characteristics of the liquid crystal display, the composition optionally has the following physical properties (1) to (8):

(1) high stability to heat, light, etc.;
(2) high clearing point;
(3) low lower limit temperature of liquid crystal phase;
(4) low viscosity;
(5) appropriate optical anisotropy;
(6) large negative dielectric anisotropy;
(7) appropriate elastic constant;
(8) good compatibility of liquid crystal compound.

The physical properties of liquid crystal compositions have an important influence on the display effect of liquid crystal displays. For example, the liquid crystal composition with high stability to heat, light, and the like can increase the voltage retention rate of the liquid crystal display, thereby prolonging the service life of the liquid crystal display; the liquid crystal composition with a high clearing point and low lower limit temperature of the liquid crystal phase can expand the usable temperature range of the liquid crystal display; the liquid crystal composition with low viscosity can shorten the response time of the liquid crystal display; the liquid crystal composition having appropriate optical anisotropy can improve the contrast of the liquid crystal display, and the liquid crystal composition having large optical anisotropy is more appropriate when the liquid crystal display has been gradually developing thinner; the liquid crystal composition having large negative dielectric anisotropy can reduce the threshold voltage of the liquid crystal display element, thereby reducing the power consumption; the liquid crystal composition with a large elastic constant can shorten the response time of the liquid crystal display, and the liquid crystal composition with a small elastic constant can reduce the threshold voltage of the liquid crystal display; and good compatibility of the liquid crystal compound is beneficial to mixing liquid crystal compounds with different physical properties to adjust the physical properties of the liquid crystal composition.

In addition, improving the contrast of the liquid crystal display is also one of the goals sought to be achieved by the industry through continuous researches. The research shows that the most important factor affecting the contrast of the liquid crystal display element is the light leakage of the liquid crystal material, and the main factor affecting the light leakage is LC Scattering of the liquid crystal material, and the LC Scattering and the average elastic constant $K_{ave}$ have the following relationship:

$$LC\ Scattering \propto \frac{d \cdot \Delta n^2 \cdot (n_e + n_o)^2}{K_{ave}}$$

wherein d represents the distance between liquid crystal cells, $n_e$ represents the refractive index of extraordinary light, and $n_o$ represents the refractive index of ordinary light. It can be seen from this relationship that LC Scattering is inversely proportional to $K_{ave}$, and the light leakage of the liquid crystal material can be reduced by increasing $K_{ave}$.

In addition, the relationship between the contrast rate (CR) and the luminance (L) is as follows:

$$CR = L_{255}/L_0 \times 100\%,$$

wherein $L_{255}$ is the On-state luminance, and $L_0$ is the Off-state luminance. It can be seen that CR is significantly affected by the change of $L_0$. In the Off state, $L_0$ has nothing to do with the dielectric of the liquid crystal molecule but is related to the LC Scattering of the liquid crystal material. The smaller the LC Scattering, the smaller the $L_0$, and the more significantly CR will be increased.

In addition, the current liquid crystal display device still has the problem of high power consumption, which is because only about 5% of the backlight can penetrate the display device and then be captured by human eyes while most of the light is "wasted". If the liquid crystal with high transmittance can be developed, the backlight intensity can be reduced, thus achieving the purpose of saving energy consumption and prolonging the service time of the device.

Chinese Patent Announcement No. CN107973766A discloses a liquid crystal compound of cycloalkyl-containing dibenzofuran derivative, and the structure thereof is shown as follows:

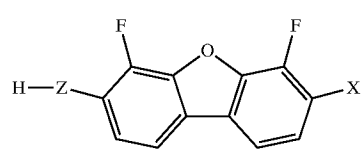

A in which, H represents one of cyclopropyl, cyclobutyl, cyclopentyl or 2-tetrahydrofuranyl; Z represents one of a single bond, —$CH_2$—, —O—, —$CH_2CH_2$— or —CH₂O—; and X represents a hydrogen atom, a fluorine atom, an alkyl group having 1-7 carbon atoms or an alkoxy group having 1-7 carbon atoms.

The above liquid crystal compound of cycloalkyl-containing dibenzofuran derivative has a good intersolubility with other liquid crystal compounds, and the low temperature stability is improved accordingly. However, the transmittance of the liquid crystal composition including this type of compounds needs to be further improved.

Therefore, on the basis of the existing art, it is expected to develop a liquid crystal composition with higher transmittance and higher contrast, so as to meet the increasing requirements of visual effects and low power consumption of the liquid crystal display.

SUMMARY OF THE INVENTION

The objective of the present application is to provide a liquid crystal composition containing a dibenzo derivative and a liquid crystal display device, the liquid crystal composition has a high clearing point, a large optical anisotropy, a large dielectric anisotropy, a larger dielectric constant perpendicular to the molecular axis $\varepsilon_\perp$, a larger ratio of perpendicular dielectric to a absolute value of dielectric $\varepsilon_\perp/|\Delta\varepsilon|$, and a larger average elastic constant $K_{ave}$.

In order to achieve the above objective, the present application utilizes the following technical solutions:

In the first aspect, the present application provides a liquid crystal composition containing a dibenzo derivative, the liquid crystal composition includes at least one compound of general formula I and at least one compound of general formula II:

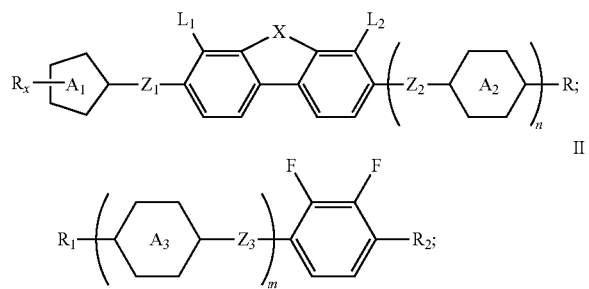

in which,

R represents —H, halogen, —CN, $C_{1-12}$ linear or branched alkyl,

one or at least two nonadjacent —CH₂— in the $C_{1-12}$ linear or branched alkyl may be respectively and independently replaced by —CH=CH—, —C≡C—, —O—, —S—, —CO—, —CO—O— or —O—CO—, one or at least two —H in the aforesaid groups may be respectively and independently substituted by —F or —Cl;

$R_x$ represents —H, $C_{1-12}$ linear or branched alkyl, one or at least two nonadjacent —CH₂— in the $C_{1-12}$ linear or branched alkyl may be respectively and independently replaced by —CH=CH—, —C≡C—, —O—, —S—, —CO—, —CO—O— or —O—CO—, one or at least two —H in the $C_{1-12}$ linear or branched alkyl may be respectively and independently substituted by —F or —Cl, $R_x$ is attached to an arbitrary carbon atom in ring

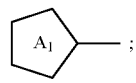

$R_1$ and $R_2$ each independently represents $C_{1-12}$ linear or branched alkyl,

one or at least two nonadjacent —CH₂— in the $C_{1-12}$ linear or branched alkyl may be respectively and independently replaced by —CH=CH—, —C≡C—, —O—, —CO—, —CO—O— or —O—CO—, ring

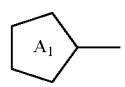

represents

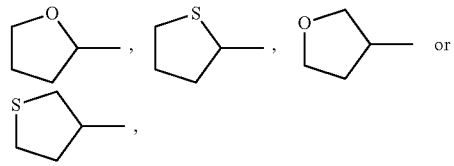

one or at least two single bond within the ring of the aforesaid groups may be replaced by double bond; ring

represents

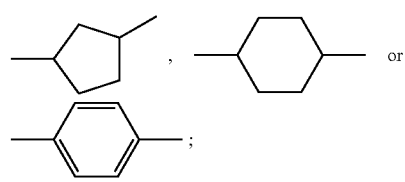

one or at least two —CH₂— in

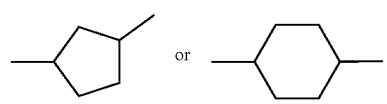

may be replaced by —O—, one or at most two single bond within the ring may be replaced by double bond; one or at least two —H in

may be substituted by —F or —Cl, one or at least two —CH= within the ring may be replaced by —N=; "one or at least two" in "one or at least two —CH= within the ring may be replaced by —N=" refers to the number of —CH= replaced by —N=, the same expressions involved in the present application all have the same meaning; ring

represents

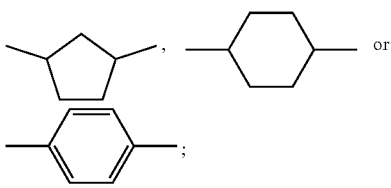

one or at least two —CH$_2$— in

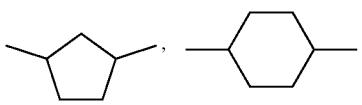

may be replaced by —O—, one or at most two single bond within the if may be replaced by double bond; one or at least two —H in

may be substituted by —F or —Cl, one or at least two —CH= within the ring may be replaced by —N=;
Z$_1$ represents —(CH$_2$)$_a$O— or —(CH$_2$)$_a$S—, wherein a represents an integer of 0 to 7, for example, a may be 0, 1, 2, 3, 4, 5, 6 or 7;
Z$_2$ represents —O—, —S—, —CO—O—, —O—CO—, —CF$_2$O—, —OCF$_2$—, —CH$_2$O—, —CH$_2$S—, —OCH$_2$—, —SCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or single bond;
Z$_3$ represents single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—;

L$_1$ and L$_2$ each independently represents —F, —Cl, —CF$_3$ or —CHF$_2$;
X represents —CO—, —S— or —O—;
n represents 0, 1 or 2, wherein when n represents 2, ring

is same or different, Z$_2$ is same or different;
m represents 0, 1 or 2, wherein when m represents 2, ring

is same or different, Z$_3$ is same or different; and
at least one group of the following three groups: R$_1$, ring

and Z$_3$, contains at least one of —CH=CH— or —C≡C—, i.e., at least one of R$_1$, ring

and Z$_3$ contains carbon-carbon unsaturated bond other than aryl unsaturated bond.

In the present application, C$_{1-12}$ may be 1, 2, 3, 4, 5, 6, 7, 8, 9, 10, 11 or 12 carbon atoms.

The carbon-carbon unsaturated bond of the present application is —CH=CH— or —C≡C—, for example, R$_1$ represents CH$_2$=CH—, or ring

represents

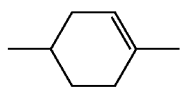

or Z$_3$ represents —CH=CH—, etc.
When n=2, there are two

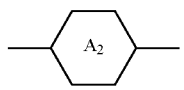

in the compound, these two

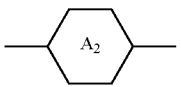

may have the same structure or different structures. For example, one may be

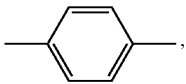

and the other is

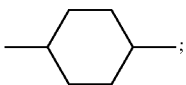

when the expressions of "same or different" involved in the present application, they all have the same meaning.

In the present application, "may be respectively and independently replaced by . . . " refers that it may be replaced or may not be replaced, that is, "replaced" or "not replaced", both of which fall within the protection scope of the present application. The same applies to the expression of "may be respectively and independently substituted by", and the "replacement" and "substitution" may occur at arbitrary position(s).

In the present application, the short straight line(s) on one side or both sides of the group structure represent the access bond and do not represent methyl, for example, the short straight line on the right side of

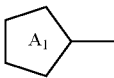

and the short straight lines on both sides of

In the present application, halogen comprises fluorine, chlorine, bromine, iodine and the like.

In the compound of general formula I of the present application, ring

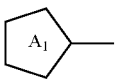

is of the five-numbered O-containing heterocycle structure or five-numbered S-containing heterocycle structure. Compared with the existing art in which ring

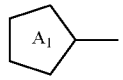

is five-membered carbocycle, the compound of general formula I of the present application has a larger dielectric constant perpendicular to the molecular axis $\varepsilon_\perp$, which is more beneficial to improve the ratio of perpendicular dielectric to the absolute value of dielectric $\varepsilon_\perp/|\Delta\varepsilon|$ of the liquid crystal composition, while maintaining the dielectric anisotropy constant, thus achieving the technical effect of improving the transmittance of the liquid crystal composition. In addition, the compound of the general formula I of the present application also has a larger average elastic constant $K_{ave}$, such that the liquid crystal display device including the liquid crystal composition of the present application has a smaller amount of light leakage and a higher contract in the Off state.

It is also surprisingly discovered in the present application that, in the compound of general formula I, $Z_1$ is of alkoxyene or thioalkylene structure, as compared with the technical solution in which $Z_1$ represents linear alkylene, the compound of general formula I exhibits a stronger overall conjugation effect, and both the ratio of perpendicular dielectric to the absolute value of dielectric $\varepsilon_\perp/|\Delta\varepsilon|$ and average elastic constant $K_{ave}$ are significantly improved after the synergistic interaction between the intramolecular groups, which is more beneficial to achieving the effects of high transmittance and high contrast of the present application.

In an optional embodiment of the present application, n represents 0.

In an optional embodiment of the present application, both $L_1$ and $L_2$ represent —F.

In an optional embodiment of the present application, X represents —O— or —S—.

In an optional embodiment of the present application, the liquid crystal composition contains at least one compound of general formula I in which X represents —O—; optionally, the liquid crystal composition contains at least one compound of general formula I in which X represents —O— and at least one compound of general formula I in which X represents —S—.

In an optional embodiment of the present application, a represents an integer from 0 to 3, for example, 0, 1, 2 or 3; further optionally, a represents an integer from 1 to 3; optionally, a represents 1.

In an optional embodiment of the present application, R represents $C_{1-12}$ (for example, $C_1$, $C_2$, $C_3$, $C_4$, $C_5$, $C_6$, $C_8$, $C_{10}$ or $C_{11}$, etc.) linear or branched alkyl, or one or at least two nonadjacent —$CH_2$— in the $C_{1-12}$ (for example, $C_1$, $C_2$, $C_3$, $C_4$, $C_5$, $C_6$, $C_8$, $C_{10}$ or $C_{11}$, etc.) linear or branched alkyl may be respectively and independently replaced by —O— or —S—.

In an optional embodiment of the present application, R represents $C_{1-12}$ (for example, $C_1$, $C_2$, $C_3$, $C_4$, $C_5$, $C_6$, $C_8$, $C_{10}$ or $C_{11}$, etc.) linear alkyl or alkoxy.

In an optional embodiment of the present application, $R_x$ represents —H, $C_{1-12}$ (for example, $C_1$, $C_2$, $C_3$, $C_4$, $C_5$, $C_6$, $C_8$, $C_{10}$ or $C_{11}$, etc.) linear or branched alkyl.

In an optional embodiment of the present application, $R_x$ represents —H or $C_{1-6}$ linear alkyl.

In an optional embodiment of the present application, the compound of general formula I comprises 0.1-40%, for example 0.2%, 0.5%, 0.8%, 1%, 3%, 5%, 8%, 10%, 12%, 15%, 18%, 20%, 22%, 25%, 28%, 30%, 32%, 35%, 37% or 39%, etc., of the total weigh of the liquid crystal composition; optionally, the compound of general formula I comprises 1-30% of the total weight of the liquid crystal composition.

In an optional embodiment of the present, the compound of general formula II meets at least one of the following conditions a)~c):

a) $R_1$ represents $C_{2-10}$ (for example, $C_2$, $C_3$, $C_4$, $C_5$, $C_6$, $C_8$, $C_9$ or $C_{10}$) alkenyl or alkenoxy;
b) when m represents 1 or 2, at least one ring

represents

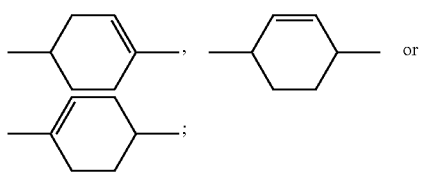

c) when m represents 1 or 2, at least one $Z_3$ represents —CH=CH— or —C≡C—.

The alkenyl in the present application is optionally a group represented by any one of formula (V1) to formula (V9), optionally formula (V1), formula (V2), formula (V8) or formula (V9). The groups represented by formula (V1) to formula (V9) are as follows:

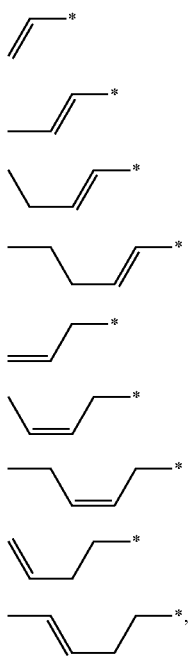

in which, * represents the site through which the above-mentioned group is attached to the compound.

The alkenoxy group in the present application is optionally a group represented by any one of formula (OV1) to formula (OV9), optionally formula (OV1), formula (OV2), formula (OV8) or formula (OV9). The groups represented by formula (OV1) to formula (OV9) are as follows:

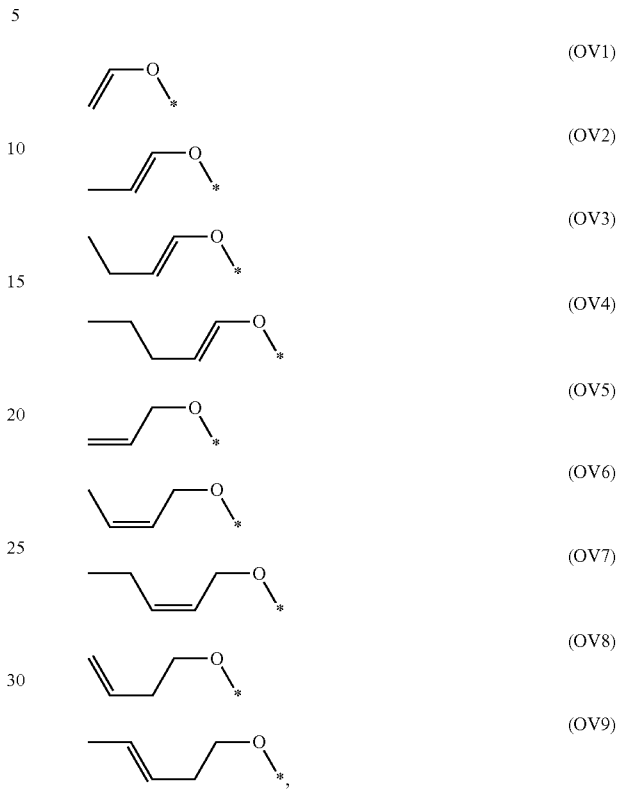

in which, * represents the site through which the above-mentioned group is attached to the compound.

In an optional embodiment of the present application, the compound of general formula II is selected from a group consisting of the following compounds:

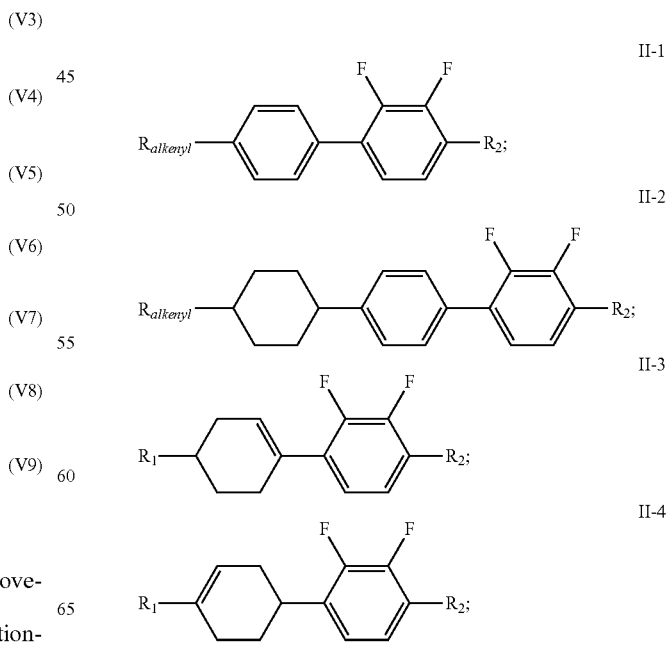

-continued

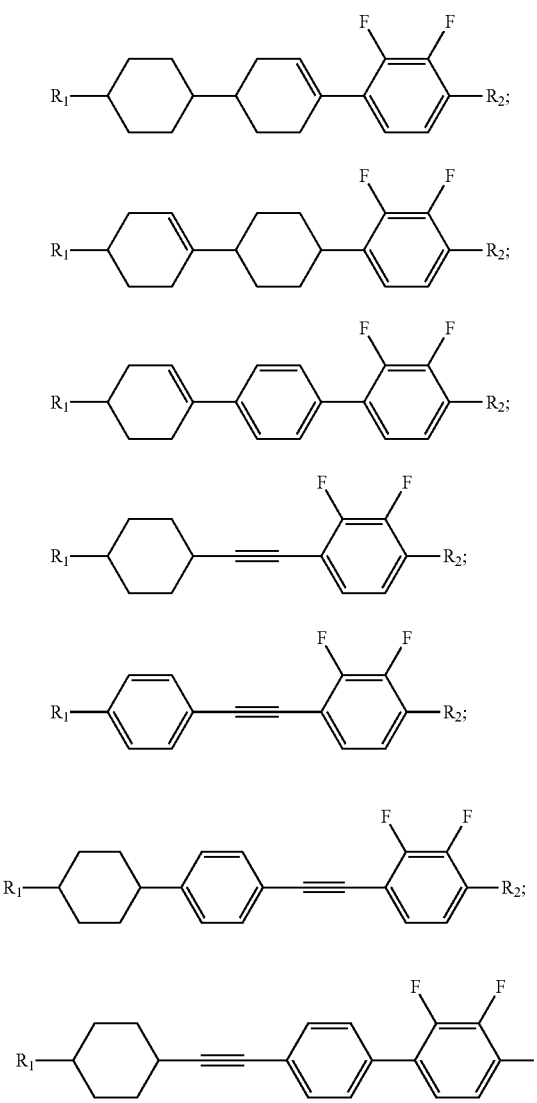

II-5

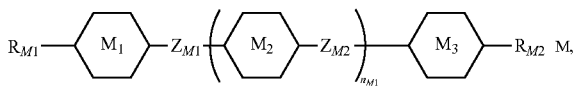 M, in which, $R_{M1}$ and $R_{M2}$ each independently represents $C_{1-12}$ (for example, $C_1$, $C_2$, $C_3$, $C_4$, $C_5$, $C_6$, $C_8$, $C_{10}$ or $C_{11}$, etc.) linear or branched alkyl,

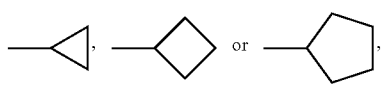

one or at least two nonadjacent —$CH_2$— in the $C_{1-12}$ linear or branched alkyl may be respectively and independently replaced by —CH=CH—, —C≡C—, —O—, —CO—, —CO—O— or —O—CO—;

ring

ring

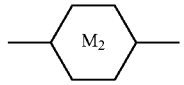

and ring

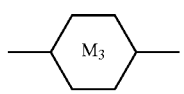

each independently represents

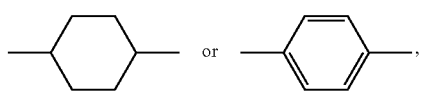

one or at least two —$CH_2$— in

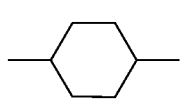

may be replaced by —O—, at most one —H in

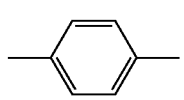

in which, $R_{alkenyl}$ represents $C_{2-7}$ (for example, $C_2$, $C_3$, $C_4$, $C_5$, $C_6$ or $C_7$) alkenyl;

$R_1$ and $R_2$ each independently represents $C_{1-10}$ (for example, $C_1$, $C_2$, $C_3$, $C_4$, $C_5$, $C_6$, $C_7$, $C_8$, $C_9$ or $C_{10}$) linear alkyl or alkoxy, or $C_{2-10}$ (for example, $C_2$, $C_3$, $C_4$, $C_5$, $C_6$, $C_7$, $C_8$, $C_9$ or $C_{10}$) linear alkenyl or alkenoxy.

In an optional embodiment of the present application, the compound of general formula II comprises 0.1-50%, for example 0.2%, 0.5%, 0.8%, 1%, 3%, 5%, 8%, 10%, 12%, 15%, 18%, 20%, 22%, 25%, 28%, 30%, 32%, 35%, 37%, 39%, 40%, 42%, 45%, 47% or 49%, etc., of the total weight of the liquid crystal composition; optionally, the compound of general formula II comprises 1-45% of the total weight of the liquid crystal composition, optionally, the compound of general formula II comprises 5-43% of the total weight of the liquid crystal composition.

In an optional embodiment of the present application, the liquid crystal composition further includes one or at least two compound of general formula M may be substituted by halogen;

$Z_{M1}$ and $Z_{M2}$ each independently represents single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—;

$n_{M1}$ represents 0, 1, 2 or 3, wherein when $n_{M1}$=2 or 3, ring

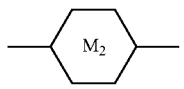

is same or different, $Z_{M2}$ is same or different.

In an optional embodiment of the present application, $R_{M1}$ and $R_{M2}$ each independently represents $C_{1-10}$ (for example, $C_1$, $C_2$, $C_3$, $C_4$, $C_5$, $C_6$, $C_8$, $C_9$ or $C_{10}$) linear alkyl, $C_{1-9}$ (for example, $C_1$, $C_2$, $C_3$, $C_4$, $C_5$, $C_6$, $C_8$ or $C_9$) linear alkoxy or $C_{2-10}$ (for example, $C_2$, $C_3$, $C_4$, $C_5$, $C_6$, $C_8$, $C_9$ or $C_{10}$) linear alkenyl.

Optionally, $R_{M1}$ and $R_{M2}$ each independently represents $C_{1-8}$ linear alkyl, $C_{1-7}$ linear alkoxy or $C_{2-8}$ linear alkenyl.

Optionally, $R_{M1}$ and $R_{M2}$ each independently represents $C_{1-5}$ linear alkyl, $C_{1-4}$ linear alkoxy or $C_{2-5}$ linear alkenyl.

In an optional embodiment of the present application, any one of $R_{M1}$ and $R_{M2}$ is $C_{2-5}$ linear alkenyl, and the other is $C_{1-5}$ linear alkyl.

In an optional embodiment of the present application, any one of $R_{M1}$ and $R_{M2}$ is $C_{1-5}$ linear alkyl, and the other is $C_{1-5}$ linear alkyl or $C_{1-4}$ linear alkoxy; optionally, both $R_{M1}$ and $R_{M2}$ are each independently $C_{1-5}$ linear alkyl.

In an optional embodiment of the present application, the compound of general formula M is selected from a group consisting of the following compounds:

M1
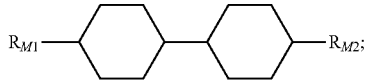

M2
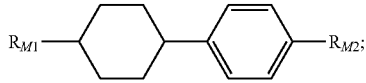

M3
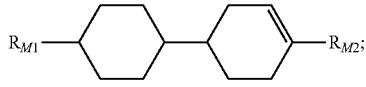

M4
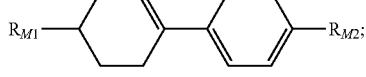

M5
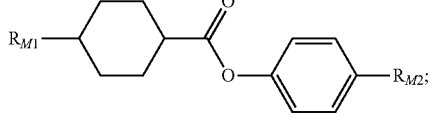

M6
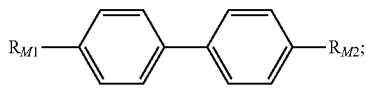

M7
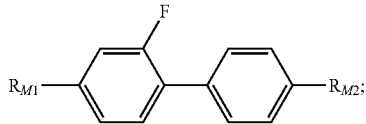

-continued

M8
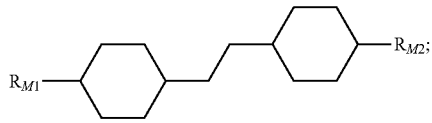

M9
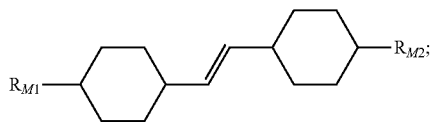

M10
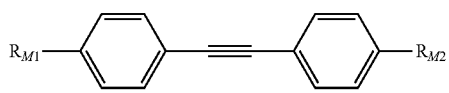

M11
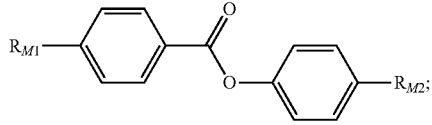

M12
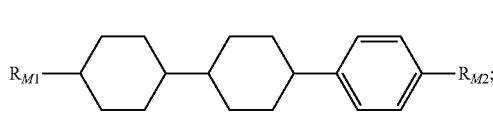

M13
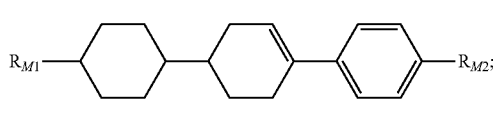

M14
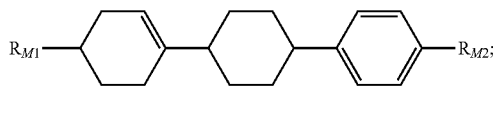

M15
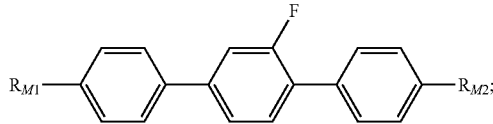

M16

M17

M18

M19

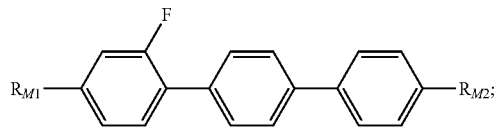

M20

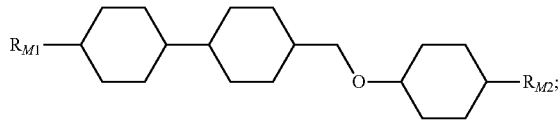

M21

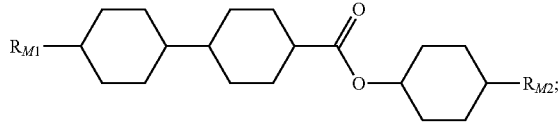

M22

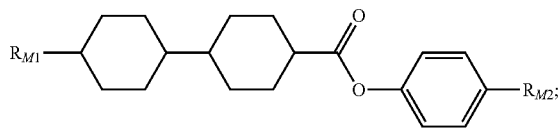

M23

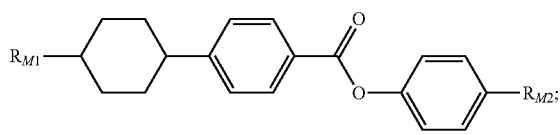

M24

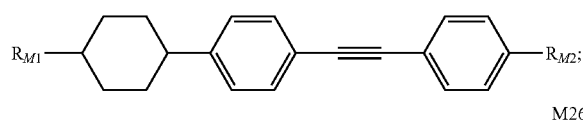

M25

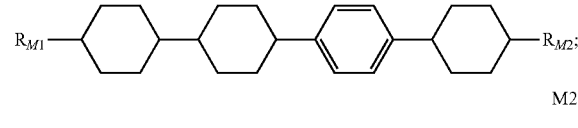

M26

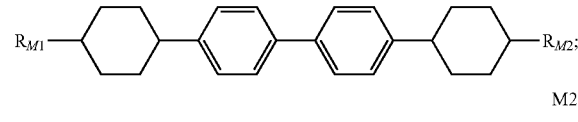

M27

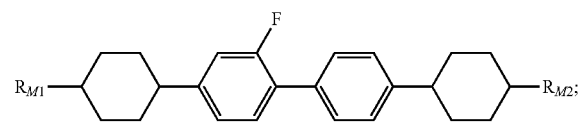

M28

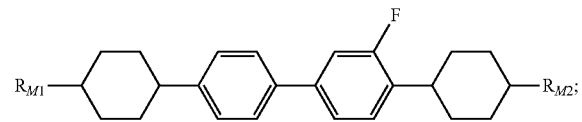

M29

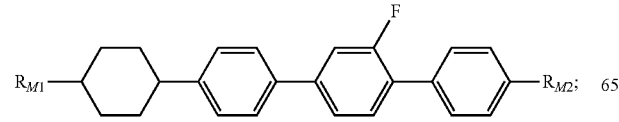

M30

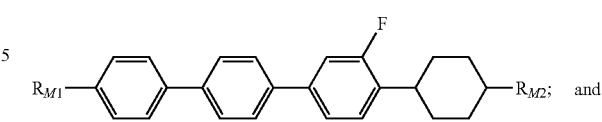

M31

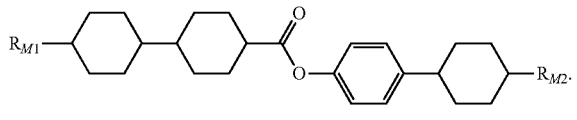

M32

Wherein, $R_{M1}$ and $R_{M2}$ each independently represents $C_{1-12}$ (for example, $C_1$, $C_2$, $C_3$, $C_4$, $C_5$, $C_6$, $C_8$, $C_{10}$ or $C_{11}$, etc.) linear or branched alkyl, or one or at least two nonadjacent —$CH_2$— in the $C_{1-12}$ linear or branched alkyl may be respectively and independently replaced by —CH=CH— or —O—.

Optionally, $R_M1$ and $R_{M2}$ each independently represents $C_{1-10}$ (for example, $C_1$, $C_2$, $C_3$, $C_4$, $C_5$, $C_6$, $C_8$, $C_9$ or $C_{10}$) linear alkyl, $C_{2-10}$ (for example, $C_2$, $C_3$, $C_4$, $C_5$, $C_6$, $C_8$, $C_9$ or $C_{10}$) linear alkenyl or $C_{1-9}$ (for example, $C_1$, $C_2$, $C_3$, $C_4$, $C_5$, $C_6$, $C_8$ or $C_9$) linear alkoxy.

Optionally, the compound of general formula M comprises 1-70%, for example, 2%, 4%, 6%, 8%, 10%, 13%, 15%, 18%, 20%, 22%, 25%, 28%, 30%, 33%, 35%, 38%, 40%, 43%, 45%, 48%, 50%, 52%, 55%, 58%, 60%, 62%, 65%, 67% or 69%, etc., of the total weight of the liquid crystal composition.

In order to adjust the properties of the liquid crystal composition in terms of clearing point, viscosity, and low-temperature storage stability and the like to enable the obtained liquid crystal display device to have great application value in addition to excellent performance in terms of transmittance and color performance, the components of the liquid crystal composition need to be adjusted. Specifically, the content of the compound of general formula M in which ring

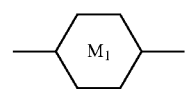

represents

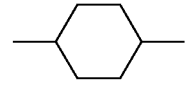

is 10% to 50%; optionally, the content of the compound in general formula M in which ring

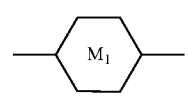

represents

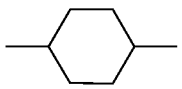

is 20% to 45%, relative to the total weight of the liquid crystal composition of the present application.

As for the content of the compound of general formula M, a high lower limit value and a high upper limit value may be selected when it is necessary to keep the viscosity of the liquid crystal composition of the present application lower and the response time thereof shorter; further, a high lower limit value and a high upper limit value may be selected when it is necessary to keep the clearing point of the liquid crystal composition of the present application higher and the temperature stability good; and, when in order to keep the driving voltage lower and make the absolute value of the dielectric anisotropy become large, it is optional to make the lower limit value become low and the upper limit value become low.

In the case where reliability is a priority, optionally, $R_{M1}$ and $R_{M2}$ are each independently alkyl; in the case where reducing the volatility of the compound is a priority, optionally, $R_{M1}$ and $R_{M2}$ are each independently alkoxy; and in the case where reducing viscosity is a priority, optionally, at least one of $R_{M1}$ and $R_{M2}$ is alkenyl.

In an optional embodiment of the present application, in order to further reduce the viscosity of the liquid crystal composition, the liquid crystal composition optionally includes one or more compound of general formula M1 in which $R_{M1}$ and/or $R_{M2}$ is n-propyl:

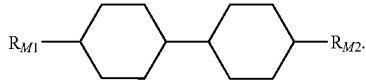

M1

In an optional embodiment of the present application, the liquid crystal composition further includes one or at least two compound of general formula N

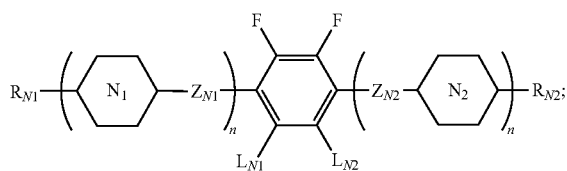

N in which, $R_{N1}$ and $R_{N2}$ each independently represents $C_{1-12}$ (for example, $C_1$, $C_2$, $C_3$, $C_4$, $C_5$, $C_6$, $C_8$, $C_{10}$ or $C_{11}$, etc.) linear or branched alkyl,

one or at least two nonadjacent —CH$_2$— in the $C_{1-12}$ linear or branched alkyl may be respectively and independently replaced by —O—, —CO—, —CO—O— or —O—CO—, one or least two —H in the $C_{1-12}$ linear or branched alkyl,

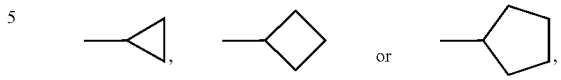

or may be respectively and independently substituted by —F or —Cl;

ring

or ring

each independently represents

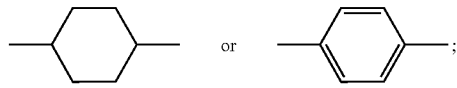

one or more —CH$_2$— in

may be replaced by —O—; one or at least two —H in

may be substituted by —F or —Cl, one or at least two —CH= within the ring may be replaced by —N=;

$Z_{N1}$ and $Z_{N2}$ each independently represents single bond, —CO—O—, —O—CO—, —CH$_2$O—, —OCH$_2$—, —CH$_2$CH$_2$—, —(CH$_2$)$_4$—, —CF$_2$O—, —OCF$_2$— or —CF$_2$CF$_2$—;

$L_{N1}$ and $L_{N2}$ each independently represents —H or methyl;

$n_{N1}$ represents 0, 1, 2 or 3, $n_{N2}$ represents 0 or 1, and $0 \leq n_{N1}+n_{N2} \leq 3$, wherein when $n_{N1}=2$ or 3, ring

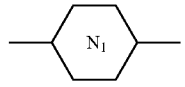

is same or different, $Z_{N1}$ is same or different;

In an optional embodiment of the present application, $R_{N1}$ and $R_{N2}$ each independently represents $C_{1-8}$ (for example, $C_1$, $C_2$, $C_3$, $C_4$, $C_5$, $C_6$, $C_7$ or $C_8$) linear or branched alkyl or alkoxy, further optionally, $R_{N1}$ and $R_{N2}$ are each independently $C_{1-5}$ linear or branched alkyl or alkoxy.

In an optional embodiment of the present application, ring and ring each independently represents In an optional embodiment of the present application, the compound of general formula N is selected by a group consisting of the following compounds:

-continued

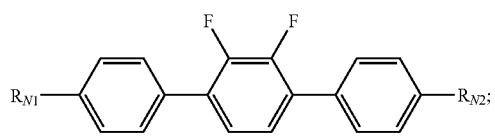
N13

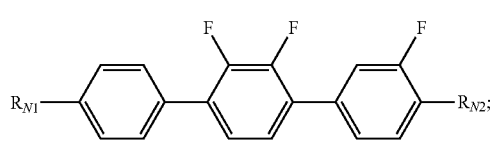
N14

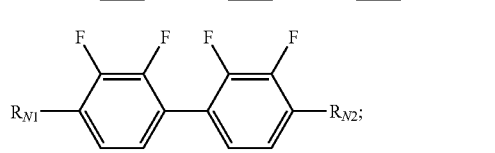
N15

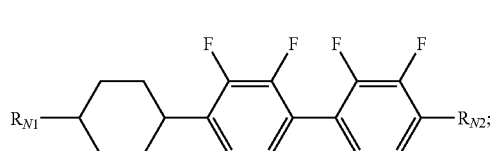
N16

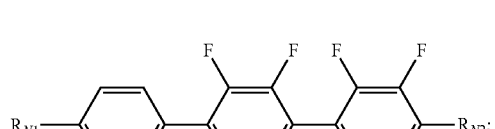
N17

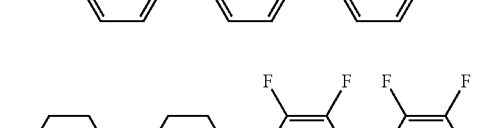
N18

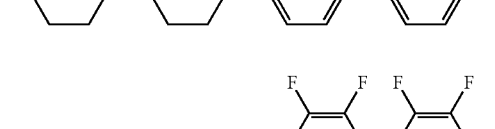
N19

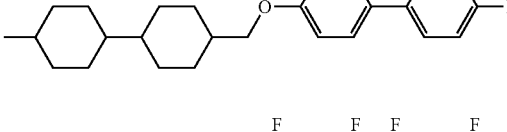
N20

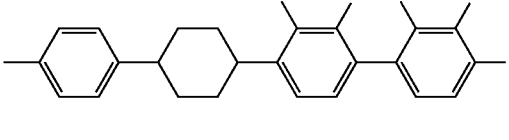

-continued

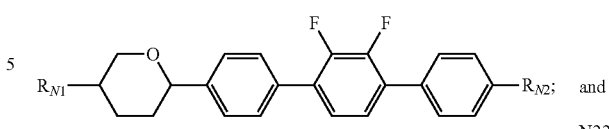
N21 and

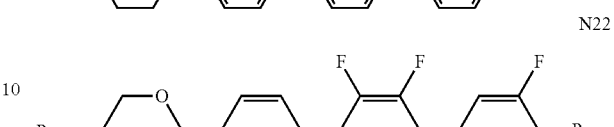
N22 in which, $R_{N1}$ represents $C_{1-5}$ (for example, $C_1$, $C_2$, $C_3$, $C_4$ or $C_5$) linear or branched alkyl, and $R_{N2}$ represents $C_{1-4}$ (for example, $C_1$, $C_2$, $C_3$ or $C_4$) linear or branched alkoxy.

In an optional embodiment of the present application, the compound of general formula N may be selected from a group consisting of the compounds of general formula N2, general formula N5 and general formula N13.

Optionally, the compound of general formula N comprises 1-75%, for example 2%, 4%, 6%, 8%, 10%, 13%, 15%, 18%, 20%, 22%, 25%, 28%, 30%, 33%, 35%, 38%, 40%, 43%, 45%, 48%, 50%, 52%, 55%, 58%, 60%, 62%, 65%, 67%, 70%, 72% or 74%, etc., of the total weight of the liquid crystal composition.

As for the content of the compound of general formula N, a low lower limit value and a low upper limit value may be selected when it is necessary to keep the response time of the liquid crystal display device of the present application shorter; further, a low lower limit value and a low upper limit value may be selected when it is necessary to keep the operating temperature range of the liquid crystal display device of the present application wider; in addition, when in order to keep the driving voltage of the liquid crystal composition of the present application low and make the absolute value of the dielectric anisotropy become large, it is optional to make the lower limit value of the content become high and the upper limit value become high.

In an optional embodiment of the present application, one or more other additives known to those skilled in the art and described in literature may be added to the liquid crystal composition.

In addition, additives such as antioxidants, light stabilizers and the like used in the liquid crystal composition of the present application may be selected from the following substances:

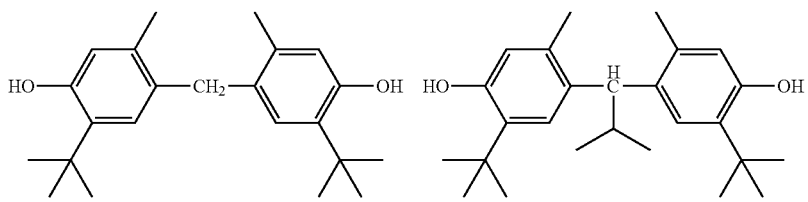

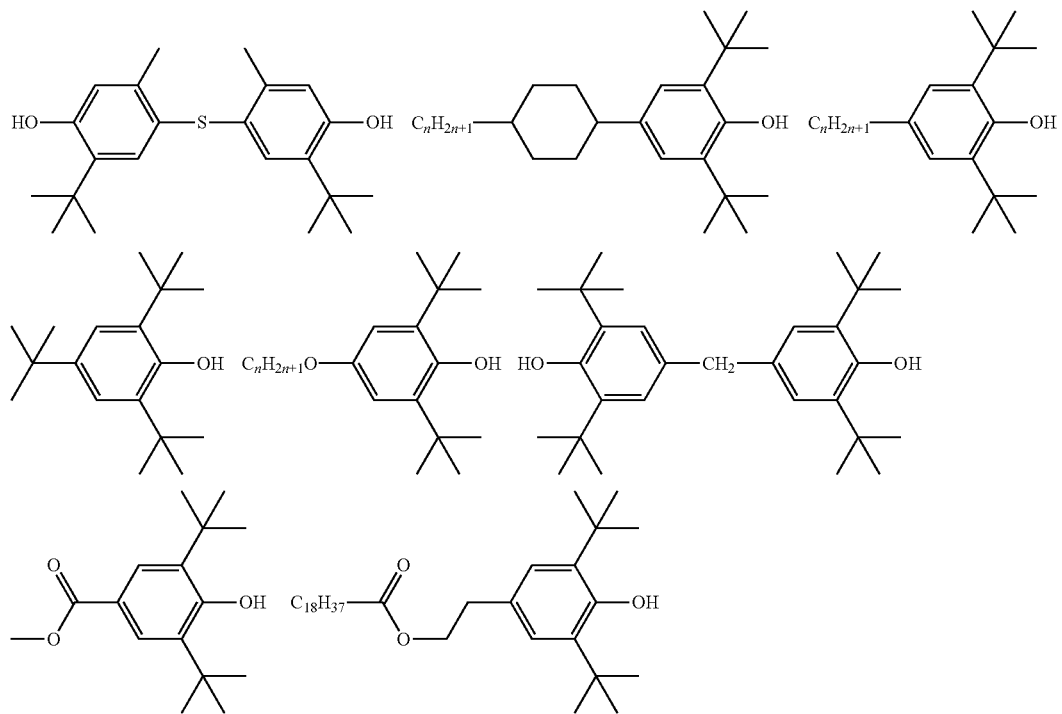
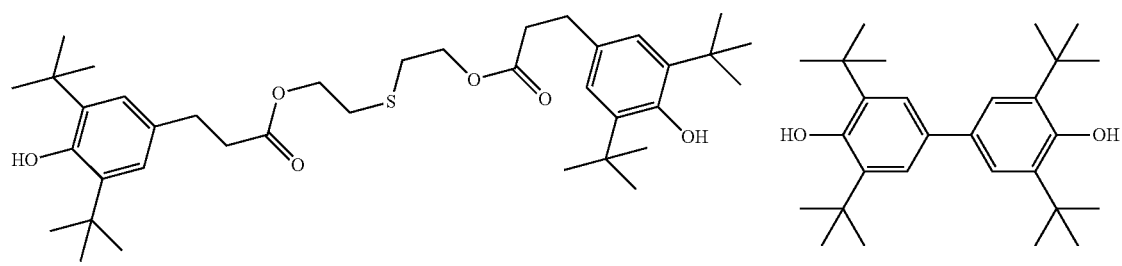
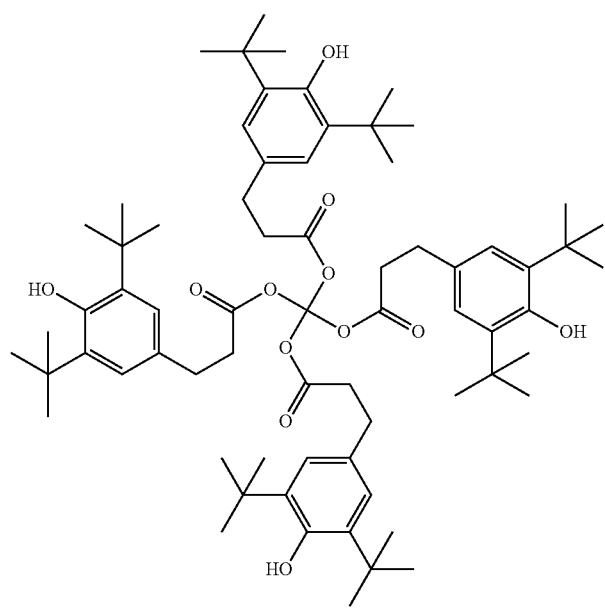

-continued
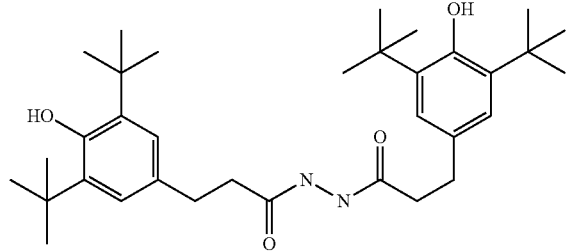
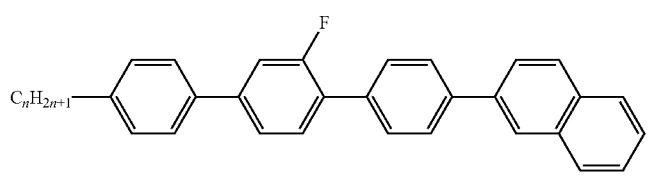
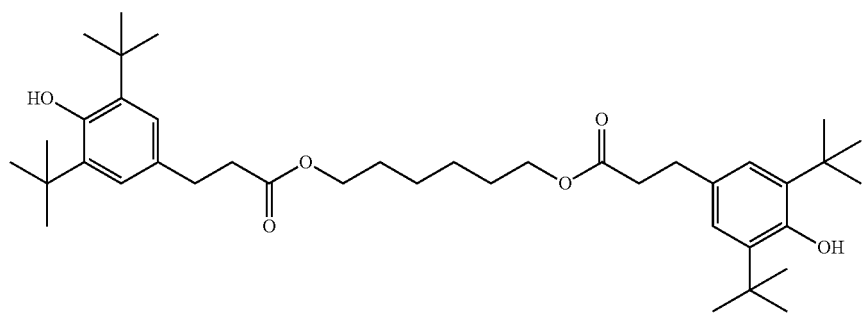
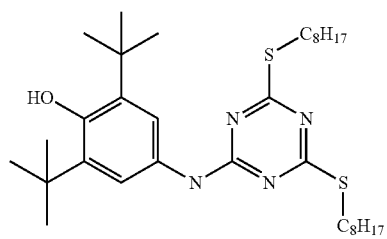
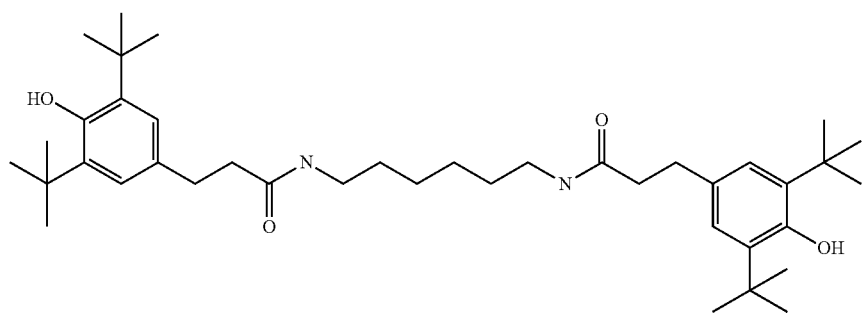

-continued
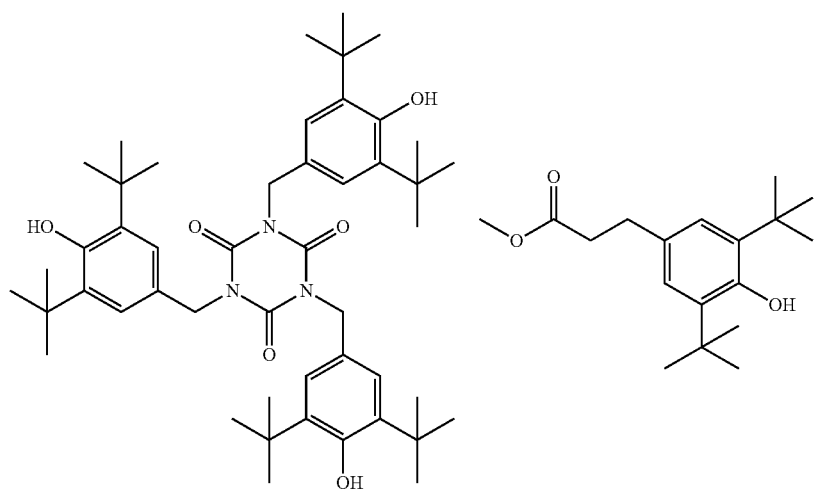
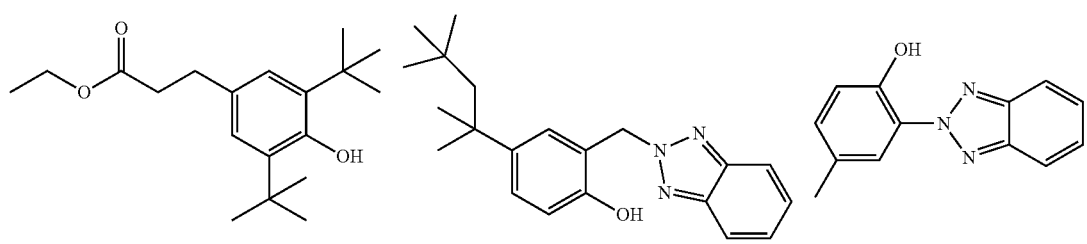
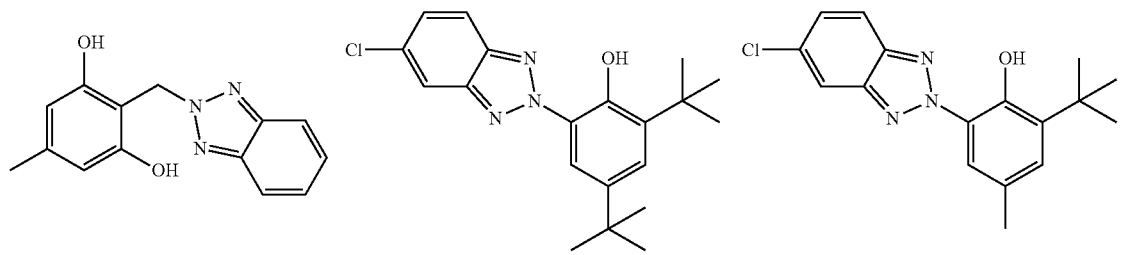
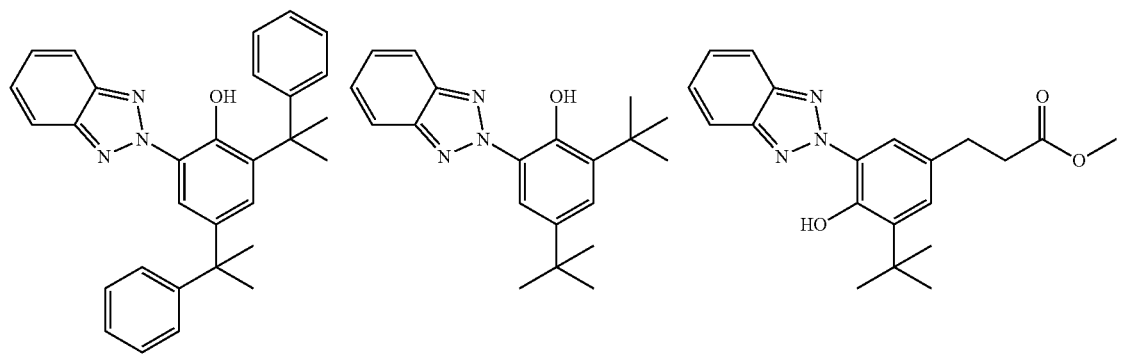

-continued
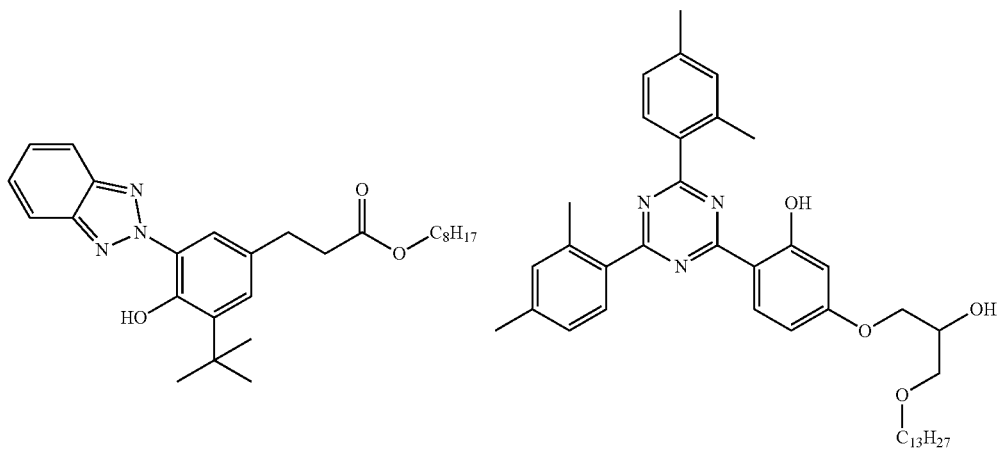
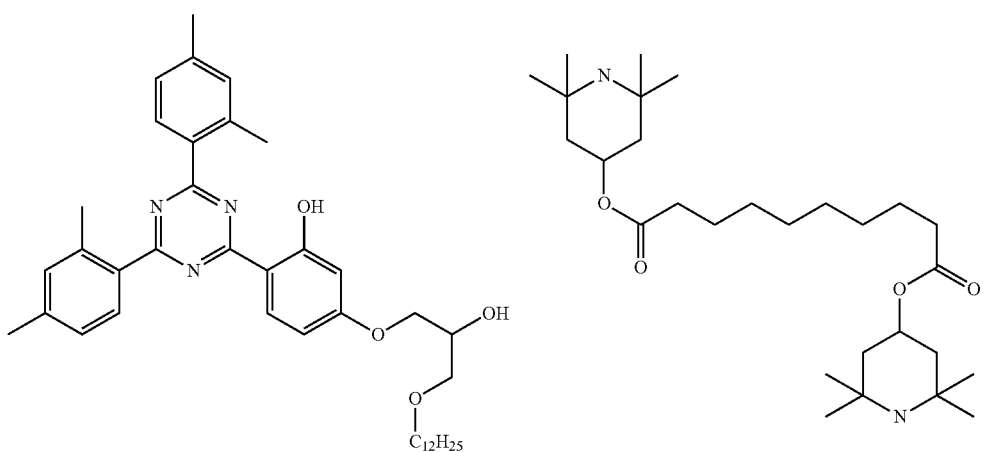
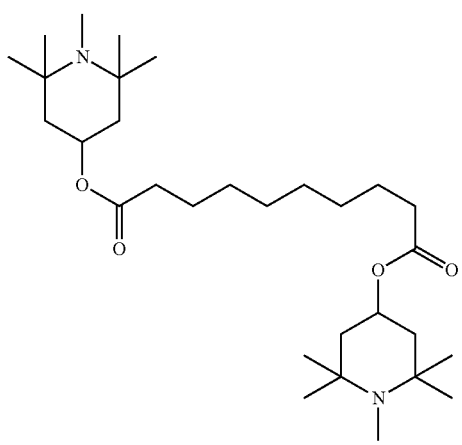
in which, n represents a positive integer of 1-12.

Optionally, the stabilizer is selected from the stabilizers as shown below.

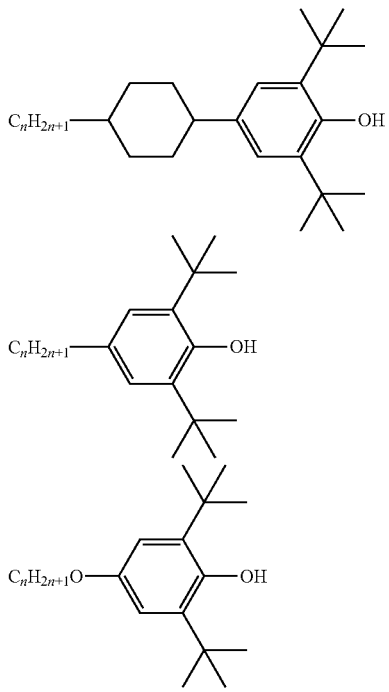

In an optional embodiment of the present application, the stabilizer comprises 0-5% of the total weight of the liquid crystal composition; optionally, the stabilizer comprises 0-1% of the total weight of the liquid crystal composition; more optionally, the stabilizer comprises 0.01-0.1% of the total weight of the liquid crystal composition.

In another aspect, the present application provides a liquid crystal display device comprising the liquid crystal composition described above.

Optionally, the liquid crystal display device is an IPS mode liquid crystal display device, an FFS mode liquid crystal display device or a VA mode liquid crystal display device.

The present application has the following beneficial effects relative to the existing art:

As compared with the existing art, through the structure optimization of the compound of general formula I and the synergistic interaction with the compound of general formula II containing a carbon-carbon unsaturated bond in the liquid crystal compositions provided by the present application, the liquid crystal composition of the present application has a larger dielectric constant perpendicular to the molecular axis $\varepsilon_\perp$, a larger ratio of perpendicular dielectric to a absolute value of dielectric $\varepsilon_\perp \varepsilon_\perp / |\Delta \varepsilon|$ and a larger average elastic constant $K_{ave}$, while maintaining substantially equivalent clearing point, optical anisotropy and dielectric anisotropy, such that the liquid crystal display device including such liquid crystal composition has a higher transmittance and a higher contrast, exhibits a better display effect, and has high application value in liquid crystal displays of IPS mode, FFS mode, and VA mode.

DETAILED EMBODIMENTS

The technical solutions of the present application will be further described below in conjunction with specific embodiments. Those skilled in the art should understand that the following examples are exemplary embodiments of the present application, which are only used to illustrate and help understand the present application and should not be construed as limitations to the present application. Other combinations and various modifications within the conception of the present application are possible without departing from the subject matter or scope of the present application.

In the present application, unless otherwise specified, the proportions mentioned in the present application are weight ratios, and temperatures are Celsius temperatures.

For the convenience of the expression, the group structures of the liquid crystal compositions in the following Examples are represented by the codes listed in Table 1:

TABLE 1

| Codes of the group structures of the liquid crystal compounds | | |
|---|---|---|
| Unit structure of group | Code | Name of group |
| (cyclohexane ring) | C | 1,4-cyclohexylidene |
| (cyclohexene ring) | L | 1,4-cyclohexenylene |
| (benzene ring) | P | 1,4-phenylene |
| (fluorobenzene ring) | G | 2-fluoro-1,4-phenylene |

TABLE 1-continued

Codes of the group structures of the liquid crystal compounds

| Unit structure of group | Code | Name of group |
|---|---|---|
| (2,3-difluoro-1,4-phenylene structure) | W | 2,3-difluoro-1,4-phenylene |
| (4,6-difluoro-dibenzofuran structure) | B(O) | 4,6-difluoro-dibenzo[b,d]furan-3,7-diyl |
| (4,6-difluoro-dibenzothiophene structure) | B(S) | 4,6-difluoro-dibenzo[b,d]thiophene-3,7-diyl |
| (tetrahydrofuran-2,5-diyl structure) | THF(2,5) | tetrahydrofuran-2,5-diyl |
| (tetrahydrothiophene-2,5-diyl structure) | THT(2,5) | tetrahydrothiophene-2,5-diyl |
| (tetrahydrofuran-2-yl structure) | THF | tetrahydrofuran-2-yl |
| (tetrahydrofuran-3-yl structure) | THF(3) | tetrahydrofuran-3-yl |
| (4,5-dihydrofuran-2-yl structure) | DHF(1) | 4,5-dihydrofuran-2-yl |
| (tetrahydrothiophene-2-yl structure) | THT | tetrahydrothiophene-2-yl |
| (tetrahydrothiophene-3-yl structure) | THT(3) | tetrahydrothiophene-3-yl |
| (4,5-dihydrothiophene-2-yl structure) | DHT(1) | 4,5-dihydrothiophene-2-yl |
| —CH$_2$CH$_2$— | 2 | ethyl bridge bond |
| —CH$_2$CH$_2$CH$_2$— | 3 | propyl bridge group |
| —CH$_2$O— | 1O | methyleneoxy |
| —F— | F | fluorine substituent |
| —O— | O | oxygen bridge group |
| —S— | S | sulfur bridge group |
| —C$_n$H$_{2n+1}$ | n (n represents a positive integer of 1-12) | alkyl |
| —C≡C— or —C≡CH | T | ethynyl |
| —CH=CH— or —CH=CH$_2$ | V | ethenyl |

Take the compound with the following structural formula as an example:

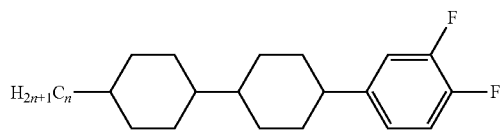

Represented by the codes listed in Table 1, this structural formula can be expressed as nCCGF, n in the code represents the number of the carbon atoms of the alkyl group on the left, for example, n is "3", meaning that the alkyl is —$C_3H_7$; C in the code represents 1,4-cyclohexylidene, G represents 2-fluoro-1,4-phenylene, F represents fluorine substituent.

The abbreviated codes of the test items in the following Examples are as follows:

Cp clearing point (nematic-isotropy phases transition temperature, ° C.)

Δεdielectric anisotropy (1 KHz, 25° C.)

$\varepsilon_\perp$ dielectric constant perpendicular to the molecular axis (1 KHz, 25° C.)

$\varepsilon_\perp/|\Delta\varepsilon|$ ratio of perpendicular dielectric constant to the absolute value of dielectric constant Δn optical anisotropy (light wavelength 589 nm, 25° C.)

$K_{ave}$ average elastic constant

T (%) Transmittance (DMS 505, cell gap 3.5 m) in which,

Cp: measured by using a melting point apparatus;

Δε: $\Delta\varepsilon=\varepsilon_\parallel-\varepsilon_\perp$, wherein $\varepsilon_\parallel$ is a dielectric constant parallel to the molecular axis, $\varepsilon_\perp$ is a dielectric constant perpendicular to the molecular axis, and the test conditions are: 25° C., 1 KHz, and a TN90 test cell with a cell gap of 7 μm;

Δn: measured by using Abbe refractometer under the light source of sodium lamp (589 nm) and at 25° C.;

$K_{ave}=\frac{1}{3}(K_{11}+K_{22}+K_{33})$, and $K_i$, $K_{22}$, and $K_{33}$ were calculated by testing the C—V curve of liquid crystal using the LCR instrument and anti-parallel friction cells with the test conditions: a 7 m anti-parallel friction cell and V=0.1~20V.

Test conditions of transmittance: the V-T curve of a dimming device, which was a negative IPS-type test cell with a cell gap of 3.5 μm, was tested by using DMS 505 photoelectric comprehensive tester, and the $T_{max}$ value in the V-T curve was the transmittance of the liquid crystal material.

Each component adopted in the following Examples can be synthesized by well-known methods or can be obtained commercially. These synthesis techniques are conventional, and the obtained liquid crystal compositions have been tested and proved to meet the standards of electronic compounds.

Liquid crystal compositions were prepared according to the proportions of liquid crystal compositions specified in the following Examples. The preparation of the liquid crystal compositions was carried out according to the conventional methods in the art, such as heating, ultrasonic wave, suspension, and the like, and by mixing components according to specified proportions.

Comparative Example 1

A liquid crystal composition, whose components and performance parameters are shown in Table 2.

TABLE 2

Components and performance parameters of the liquid crystal composition

| Component code | Weight percentage | General formula code | Performance parameters | |
|---|---|---|---|---|
| 3CWO2 | 10.5 | N2 | Cp | 94 |
| 3CLWO2 | 9 | II-5 | Δn | 0.11 |
| 3LCWO2 | 9 | II-6 | Δ∈ | −3.9 |
| 5CCWO2 | 9.5 | N5 | ∈$_\perp$ | 6.7 |
| 5CWO2 | 10 | N2 | $K_{ave}$ | 12.7 |
| 3CWO4 | 9 | N2 | T | 13.3% |
| 2PWP3 | 3 | N13 | ∈$_\perp$/|Δ∈| | 1.72 |
| 2CPWO2 | 7 | N11 | | |
| 3CPWO2 | 7 | N11 | | |
| THF2B(O)O6 | 5 | | | |
| 3CCV | 15 | M1 | | |
| VCCP1 | 3 | M12 | | |
| 3CCP1 | 3 | M12 | | |
| Total | 100 | | | |

Comparative Example 2

A liquid crystal composition, whose components and performance parameters are shown in Table 3.

TABLE 3

Components and performance parameters of the liquid crystal composition

| Component code | Weight percentage | General formula code | Performance parameters | |
|---|---|---|---|---|
| 3CWO2 | 10.5 | N2 | Cp | 94 |
| 3CLWO2 | 9 | II-5 | Δn | 0.109 |
| 3LCWO2 | 9 | II-6 | Δ∈ | −3.9 |
| 5CCWO2 | 9.5 | N5 | ∈$_\perp$ | 6.6 |
| 5CWO2 | 10 | N2 | $K_{ave}$ | 12.6 |
| 3CWO4 | 9 | N2 | T | 13.2% |
| 2PWP3 | 3 | N13 | ∈$_\perp$/|Δ∈| | 1.69 |
| 2CPWO2 | 7 | N11 | | |
| 3CPWO2 | 7 | N11 | | |
| C(5)1OB(O)O6 | 5 | | | |
| 3CCV | 15 | M1 | | |
| VCCP1 | 3 | M12 | | |
| 3CCP1 | 3 | M12 | | |
| Total | 100 | | | |

Example 1

A liquid crystal composition, whose components and performance parameters are shown in Table 4.

TABLE 4

Components and performance parameters of the liquid crystal composition

| Component code | Weight percentage | General formula code | Performance parameters | |
|---|---|---|---|---|
| 3CWO2 | 10.5 | N2 | Cp | 94 |
| 3CLWO2 | 9 | II-5 | Δn | 0.111 |
| 3LCWO2 | 9 | II-6 | Δ∈ | −4 |
| 5CCWO2 | 9.5 | N5 | ∈$_\perp$ | 7 |
| 5CWO2 | 10 | N2 | $K_{ave}$ | 13.2 |
| 3CWO4 | 9 | N2 | T | 14.2% |
| 2PWP3 | 3 | N13 | ∈$_\perp$/|Δ∈| | 1.75 |
| 2CPWO2 | 7 | N11 | | |
| 3CPWO2 | 7 | N11 | | |

TABLE 4-continued

Components and performance parameters of the liquid crystal composition

| Component code | Weight percentage | General formula code | Performance parameters | |
|---|---|---|---|---|
| THF1OB(O)O6 | 5 | I | | |
| 3CCV | 15 | M1 | | |
| VCCP1 | 3 | M12 | | |
| 3CCP1 | 3 | M12 | | |
| Total | 100 | | | |

Example 2

A liquid crystal composition, whose components and performance parameters are shown in Table 5.

TABLE 5

Components and performance parameters of the liquid crystal composition

| Component code | Weight percentage | General formula code | Performance parameters | |
|---|---|---|---|---|
| 3LWO2 | 10 | II-3 | Cp | 96 |
| 3CCWO2 | 5 | N5 | $\Delta n$ | 0.112 |
| 3LCWO2 | 9 | II-6 | $\Delta \epsilon$ | −4 |
| 3CLWO2 | 9 | II-5 | $\epsilon_\perp$ | 7.3 |
| 5LWO2 | 10 | II-3 | $K_{ave}$ | 13.6 |
| 3CWO4 | 9 | N2 | T | 14.7% |
| 2PWP3 | 3 | N13 | $\epsilon_\perp/|\Delta\epsilon|$ | 1.83 |
| 2CPWO2 | 4 | N11 | | |
| 3LPWO2 | 5 | II-7 | | |
| 2THF(2,5)1OB(S)O4 | 6 | I | | |
| THF1OB(O)O6 | 5 | I | | |
| 3CCV | 17 | M1 | | |
| VCCP1 | 4 | M12 | | |
| 3CCP1 | 4 | M12 | | |
| Total | 100 | | | |

Example 3

A liquid crystal composition, whose components and performance parameters are shown in Table 6.

TABLE 6

Components and performance parameters of the liquid crystal composition

| Component code | Weight percentage | General formula code | Performance parameters | |
|---|---|---|---|---|
| 3CWO2 | 10 | N2 | Cp | 95 |
| 2CCWO2 | 9 | N5 | $\Delta n$ | 0.114 |
| 3CCWO2 | 9 | N5 | $\Delta \epsilon$ | −4 |
| 5CCWO2 | 10 | N5 | $\epsilon_\perp$ | 7.2 |
| 5CWO2 | 7 | N2 | $K_{ave}$ | 13.3 |
| 3CWO4 | 7 | N2 | T | 14.3% |
| VCPWO2 | 4 | II-2 | $\epsilon_\perp/|\Delta\epsilon|$ | 1.8 |
| 1VCPWO2 | 5 | II-2 | | |
| 3CPWO2 | 6 | N11 | | |
| THF2SB(S)O6 | 4 | I | | |
| THF1OB(O)S4 | 5 | I | | |
| DHT(1)1OB(O)O6 | 3 | I | | |

TABLE 6-continued

Components and performance parameters of the liquid crystal composition

| Component code | Weight percentage | General formula code | Performance parameters | |
|---|---|---|---|---|
| 3CCV | 15 | M1 | | |
| VCCP1 | 3 | M12 | | |
| 3CCP1 | 3 | M12 | | |
| Total | 100 | | | |

Example 4

A liquid crystal composition, whose components and performance parameters are shown in Table 7.

TABLE 7

Components and performance parameters of the liquid crystal composition

| Component code | Weight percentage | General formula code | Performance parameters | |
|---|---|---|---|---|
| 3CWO2 | 10 | N2 | Cp | 95 |
| 2CCWO2 | 8 | N5 | $\Delta n$ | 0.116 |
| 3CCWO2 | 7 | N5 | $\Delta \epsilon$ | −4.2 |
| 5CCWO2 | 7 | N5 | $\epsilon_\perp$ | 7.5 |
| 5CWO2 | 9 | N2 | $K_{ave}$ | 13.5 |
| 3CWO4 | 8 | N2 | T | 14.7% |
| 3PTWO2 | 5 | II-9 | $\epsilon_\perp/|\Delta\epsilon|$ | 1.79 |
| 3CPTWO2 | 4 | II-10 | | |
| THF2OB(O)S6 | 3 | I | | |
| THF3OB(S)O4 | 5 | I | | |
| DHF(1)1OB(O)O6 | 3 | I | | |
| THF1OB(O)O4 | 5 | I | | |
| THT1OB(O)O6 | 5 | I | | |
| 3CCV | 15 | M1 | | |
| VCCP1 | 3 | M12 | | |
| 3CCP1 | 3 | M12 | | |
| Total | 100 | | | |

Example 5

A liquid crystal composition, whose components and performance parameters are shown in Table 8.

TABLE 8

Components and performance parameters of the liquid crystal composition

| Component code | Weight percentage | General formula code | Performance parameters | |
|---|---|---|---|---|
| 3CWO2 | 6 | N2 | Cp | 94 |
| 3CCWO2 | 6 | N5 | $\Delta n$ | 0.113 |
| 3CCWO2 | 7 | N5 | $\Delta \epsilon$ | −4.3 |
| 3LCWO2 | 5 | II-6 | $\epsilon_\perp$ | 7.5 |
| 3CWO2 | 6 | N2 | $K_{ave}$ | 13.5 |
| 5CWO2 | 5 | N2 | T | 14.7% |
| 3CWO4 | 7 | N2 | $\epsilon_\perp/|\Delta\epsilon|$ | 1.74 |
| 2CPWO2 | 7 | N11 | | |
| 3CPWO2 | 7 | N11 | | |
| THF2OB(O)S6 | 5 | I | | |
| THF3OB(S)O4 | 5 | I | | |
| 2THT(2,5)1OB(O)O6 | 3 | I | | |
| THF(3)1OB(O)O4 | 3 | I | | |
| THT1OB(O)O6 | 5 | I | | |
| 3CCV | 15 | M1 | | |
| VCCP1 | 2 | M12 | | |

TABLE 8-continued

Components and performance parameters of the liquid crystal composition

| Component code | Weight percentage | General formula code | Performance parameters |
|---|---|---|---|
| 3CCP1 | 2 | M12 | |
| 3CPO2 | 4 | M2 | |
| Total | 100 | | |

Example 6

A liquid crystal composition, whose components and performance parameters are shown in Table 9.

TABLE 9

Components and performance parameters of the liquid crystal composition

| Component code | Weight percentage | General formula code | Performance parameters | |
|---|---|---|---|---|
| 3CWO2 | 4 | N2 | Cp | 97 |
| 3CWO4 | 5 | N2 | $\Delta n$ | 0.121 |
| 5CWO2 | 5 | N2 | $\Delta \varepsilon$ | −4.3 |
| 5CWO4 | 5 | N2 | $\varepsilon_\perp$ | 7.8 |
| VCPWO2 | 7 | II-2 | $K_{ave}$ | 13.9 |
| 1VCPWO2 | 8 | II-2 | T | 15.3% |
| 1V2CPWO3 | 8 | II-2 | $\varepsilon_\perp/|\Delta\varepsilon|$ | 1.81 |
| V2CPWO2 | 7 | II-2 | | |
| THF2OB(O)S6 | 5 | I | | |
| THF3OB(S)O4 | 5 | I | | |
| 2THT(2,5)1OB(O)O6 | 3 | I | | |
| THF1SB(O)O4 | 5 | I | | |
| THT1OB(O)O6 | 5 | I | | |
| THT(3)OB(O)O5 | 3 | I | | |
| 3CCV | 19 | M1 | | |
| VCCP1 | 3 | M12 | | |
| 3CPO2 | 3 | M2 | | |
| Total | 100 | | | |

As can be seen from the comparison between Comparative Examples 1-2 and Example 1 as shown in above tables, through the structure optimization of the compound of general formula I and the synergistic interaction with the compound of general formula II containing a carbon-carbon unsaturated bond in the present application, the liquid crystal composition included in the present application has a larger dielectric constant perpendicular to the molecular axis $\varepsilon_\perp$ a larger ratio of perpendicular dielectric to a absolute value of dielectric $\varepsilon_\perp/|\Delta\varepsilon|$ and a larger average elastic constant $K_{ave}$, while maintaining substantially equivalent clearing point, optical anisotropy and dielectric anisotropy, such that the liquid crystal display device including such liquid crystal composition has a higher transmittance and a higher contrast.

As can be seen from Examples 1-6 described above, the liquid crystal compositions of the present application all have high clearing point, large optical anisotropy, large dielectric anisotropy, larger dielectric constant perpendicular to the molecular axis $\varepsilon_\perp$, larger ratio of perpendicular dielectric to a absolute value of dielectric $\varepsilon_\perp/|\Delta\varepsilon|$ and larger average elastic constant $K_{ave}$, and the liquid crystal display devices including these liquid crystal compositions all have the effects of good transmittance and high contrast. The liquid crystal compositions of the present application can meet the requirements of the liquid crystal display device on low power consumption and good display effect and have high application value in liquid crystal displays of IPS mode, FFS mode, and VA mode.

The applicant has stated that although the liquid crystal composition containing a dibenzo derivative and the liquid crystal display device of the present application are illustrated through the Examples described above in the present application, the present application is not limited to the processes and steps described above, which means that the implementation of the present application does not necessarily depend on the processes and steps described above.

The above embodiments are merely illustrative of the technical concepts and the features of the present application, and the purpose thereof is to enable those familiar with the art to understand the content of the present application and implement the present application, and should not be used to limit the protection scope of the present application.

What is claimed is:

1. A liquid crystal composition containing a dibenzo derivative, including at least one compound of general formula I and at least one compound of general formula II:

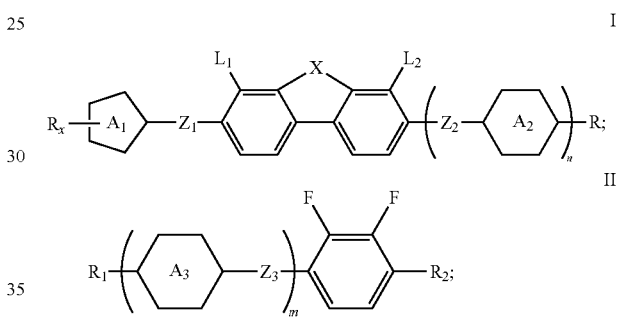

in which,
R represents —H, halogen, —CN, $C_{1-12}$ linear alkyl, $C_{3-12}$ branched alkyl,

one or at least two nonadjacent —CH$_2$— in the $C_{1-12}$ linear alkyl, $C_{3-12}$ branched alkyl,

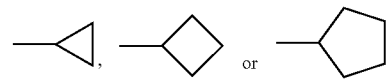

may be respectively and independently replaced by —CH═CH—, —C≡C—, —O—, —S—, —CO—, —CO—O— or —O—CO—, one or at least two —H in the aforesaid groups may be respectively and independently substituted by —F or —Cl;

$R_x$ represents —H, $C_{1-12}$ linear alkyl, $C_{3-12}$ branched alkyl, one or at least two nonadjacent —CH$_2$— in the $C_{1-12}$ linear alkyl, $C_{3-12}$ branched alkyl may be respectively and independently replaced by —CH═CH—, —C═C—, —O—, —S—, —CO—, —CO—O— or —O—CO—, one or at least two —H in the $C_{1-12}$ linear alkyl, $C_{3-12}$ branched alkyl may be respectively and independently substituted by —F or —Cl, $R_x$ is attached to an arbitrary carbon atom in ring

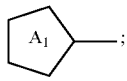

$R_1$ and $R_2$ each independently represents $C_{1-12}$ linear alkyl, $C_{3-12}$ branched alkyl,

one or at least two nonadjacent —$CH_2$— in the $C_{1-12}$ linear alkyl, $C_{3-12}$ branched alkyl may be respectively and independently replaced by —CH—CH—, —C=C—, —O—, —CO—, —CO—O— or —O—CO—;
ring

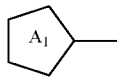

represents

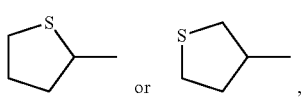

one or at least two single bond within the ring of the aforesaid groups may be replaced by double bond;
ring

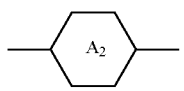

represents

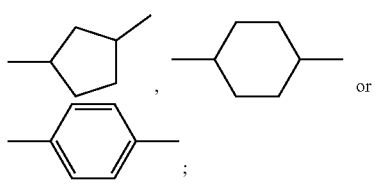

one or at least two —$CH_2$— in

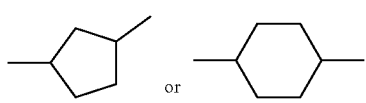

may be replaced by —O—, one or at most two single bond within the ring may be replaced by double bond; one or at least two —H in

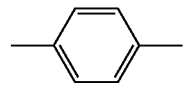

may be substituted by —F or —Cl, one or at least two —CH= within the ring may be replaced by —N=;
ring

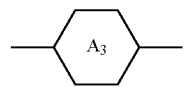

represents

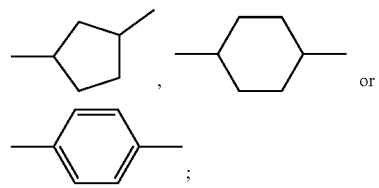

one or at least two —$CH_2$— in

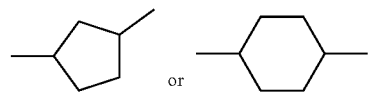

may be replaced by —O—, one or at most two single bond within the ring may be replaced by double bond; one or at least two —H in

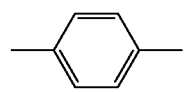

may be substituted by —F or —Cl, one or at least two —CH= within the ring may be replaced by —N=;

$Z_1$ represents —$(CH_2)_aO$— or —$(CH_2)_aS$—, wherein a represents an integer of 0 to 7;

$Z_2$ represents —O—, —S—, —CO—O—, —O—CO—, —$CF_2O$—, —$OCF_2$—, —$CH_2O$—, —$CH_2S$—, —$OCH_2$—, —$SCH_2$—, —$CH_2$—, —$CH_2CH_2$—, —$(CH_2)_4$—, —CH=CH—$CH_2O$—, —$C_2F_4$—, —$CH_2CF_2$—, —$CF_2CH_2$—, —CF=CF—, —CH=CF—, —CF=CH—, —CH=CH—, —C≡C— or single bond;

$Z_3$ represents single bond, —CO—O—, —O—CO—, —$CH_2O$—, —$OCH_2$—, —CH=CH—, —C≡C—, —$CH_2CH_2$—, —$(CH_2)_4$—, —$CF_2O$—, —$OCF_2$— or —$CF_2CF_2$—;

$L_1$ and $L_2$ each independently represents —F, —Cl, —$CF_3$ or —$CHF_2$;

X represents —CO—, —S— or —O—;
n represents 0, 1 or 2, wherein when n represents 2, ring

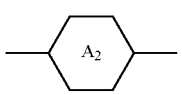

is same or different, $Z_2$ is same or different;
m represents 0, 1 or 2, wherein when m represents 2, ring

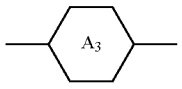

is same or different, $Z_3$ is same or different; and
at least one group of the following three groups: $R_1$, ring

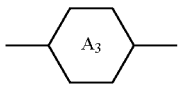

and $Z_3$, contains at least one of —CH=CH— or —C≡C—.

2. The liquid crystal composition according to claim 1, wherein n represents 0.

3. The liquid crystal composition according to claim 1, wherein both $L_1$ and $L_2$ represent —F.

4. The liquid crystal composition according to claim 1, wherein X represents —O— or —S—; and
further wherein:
a represents an integer of 0-3; or
R represents $C_{1-12}$ linear alkyl, $C_{3-12}$ branched alkyl, or one or at least two nonadjacent —CH$_2$— in the $C_{1-12}$ linear alkyl, $C_{3-12}$ branched alkyl may be respectively and independently replaced by —O— or —S—; or
$R_x$ represents —H, $C_{1-12}$ linear alkyl, $C_{3-12}$ branched alkyl; or
the liquid crystal composition contains at least one compound of general formula I in which X represents —O—; or
the liquid crystal composition contains at least one compound of general formula I in which X represents —O— and at least one compound of general formula I in which X represents —S—.

5. The liquid crystal composition according to claim 1, wherein the compound of general formula I comprises 0.1-40% of the total weight of the liquid crystal composition.

6. The liquid crystal composition according to claim 1, wherein the compound of general formula II meets at least one of following conditions a), b), or c):
a) $R_1$ represents $C_{2-10}$ alkenyl or alkenoxy;
b) when m represents 1 or 2, at least one ring

represents

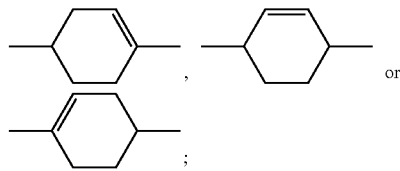

c) when m represents 1 or 2, at least one $Z_3$ represents —CH=CH— or —C≡C—.

7. The liquid crystal composition according to claim 1, wherein the compound of general formula II comprises 0.1-50% of the total weight of the liquid crystal composition.

8. The liquid crystal composition according to claim 1, wherein the liquid crystal composition further includes one or at least two compound of general formula M

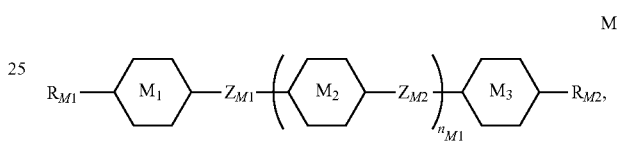

M in which,
$R_{M1}$ and $R_{M2}$ each independently represents $C_{1-12}$ linear alkyl, $C_{3-12}$ branched alkyl,

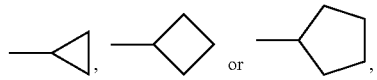

one or at least two nonadjacent —CH$_2$— in the $C_{1-12}$ linear alkyl, $C_{3-12}$ branched alkyl may be respectively and independently replaced by —CH=CH—, —C≡C—, —O—, —CO—, —CO—O— or —O—CO—;
ring

ring

and ring

each independently represents

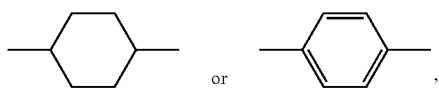

one or at least two —CH$_2$— in

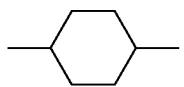

may be replaced by —O—, at most one —H in

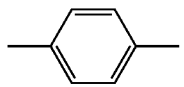

may be substituted by halogen;

$Z_{M1}$ and $Z_{M2}$ each independently represents single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—;

$n_{M1}$ represents 0, 1, 2 or 3, wherein when $n_{M1}$=2 or 3, ring

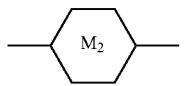

is same or different, $Z_{M2}$ is same or different.

9. The liquid crystal composition according to claim 1, wherein the liquid crystal composition further includes one or at least two compound of general formula N

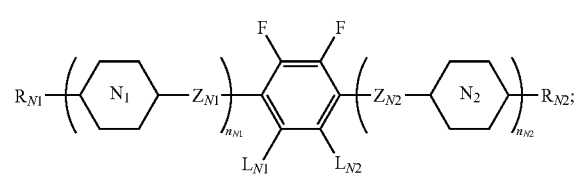

in which, $R_{N1}$ and $R_{N2}$ each independently represents C$_{1-12}$ linear alkyl, C$_{3-12}$ branched alkyl,

one or at least two nonadjacent —CH$_2$— in the C$_{1-12}$ linear alkyl, C$_{3-12}$ branched alkyl may be respectively and independently replaced by —O—, —CO—, —CO—O— or —O—CO—, one or at least two —H in the C$_{1-12}$ linear alkyl, C$_{3-12}$ branched alkyl,

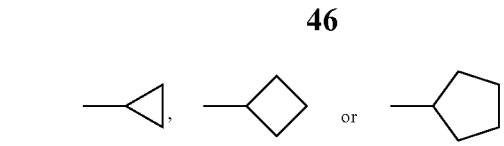

may be respectively and independently substituted by —F or —Cl;

ring

or ring

each independently represents

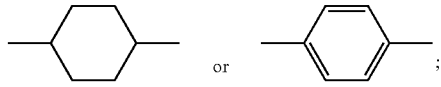

one or at least two —CH$_2$— in

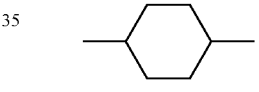

may be replaced by —O—; one or at least two —H in

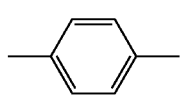

may be substituted by —F or —Cl, one or at least two —CH= within the ring may be replaced by —N=;

$Z_{N1}$ and $Z_{N2}$ each independently represents single bond, —CO—O—, —O—CO—, —CH$_2$O—, —OCH$_2$—, —CH$_2$CH$_2$—, —(CH$_2$)$_4$—, —CF$_2$O—, —OCF$_2$— or —CF$_2$CF$_2$—;

$L_{N1}$ and $L_{N2}$ each independently represents —H or methyl;

$n_{N1}$ represents 0, 1, 2 or 3, $n_{N2}$ represents 0 or 1, and $0 \leq n_{N1}+n_{N2} \leq 3$, wherein when $n_{N1}$=2 or 3, ring

is same or different, $Z_{N1}$ is same or different.

10. A liquid crystal display device including the liquid crystal composition of claim 1;

wherein the liquid crystal display device is an IPS mode liquid crystal display device, an FFS mode liquid crystal display device or a VA mode liquid crystal display device.

11. The liquid crystal composition according to claim 6, wherein the compound of general formula II is selected from a group consisting of the following compounds:

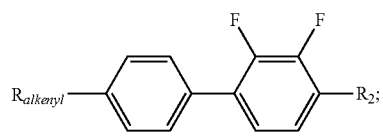
II-1

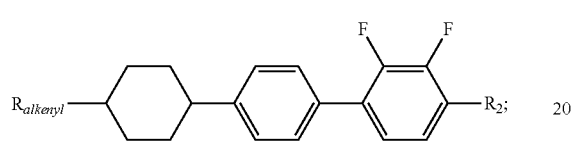
II-2

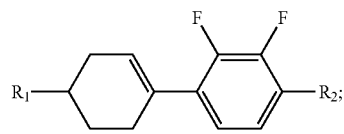
II-3

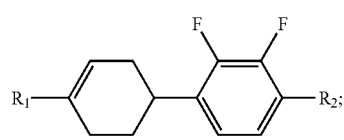
II-4

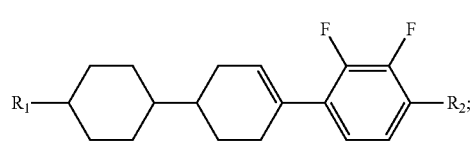
II-5

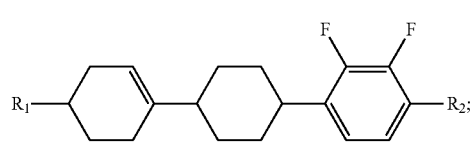
II-6

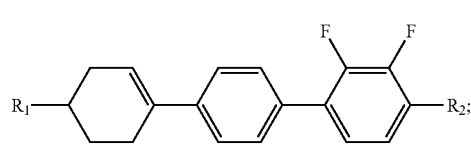
II-7

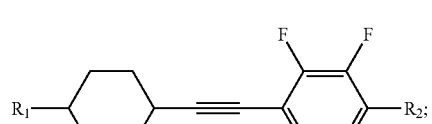
II-8

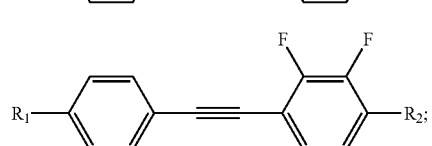
II-9

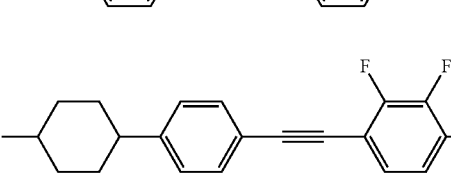
II-10

-continued

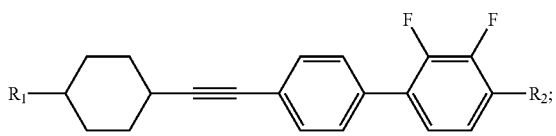
II-11 in which, $R_{alkenyl}$ represents $C_{2-7}$ alkenyl; and $R_1$ and $R_2$ each independently represents $C_{1-10}$ linear alkyl or alkoxy, or $C_{2-10}$ linear alkenyl or alkenoxy.

12. The liquid crystal composition according to claim 8, wherein the compound of general formula M is selected from a group consisting of the following compounds:

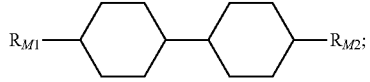
M1

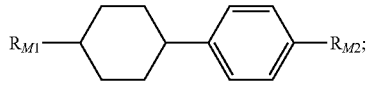
M2

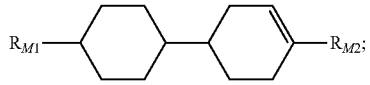
M3

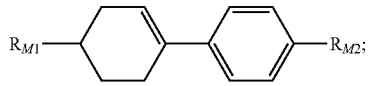
M4

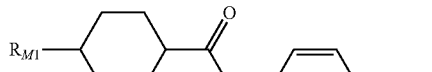
M5

M6

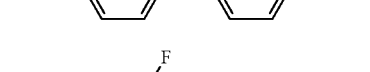
M7

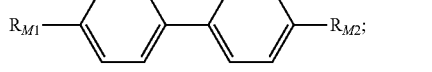
M8

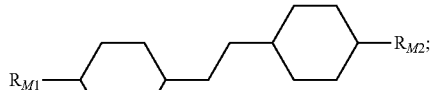
M9

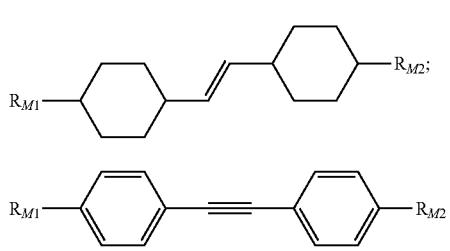
M10 and

-continued
M11
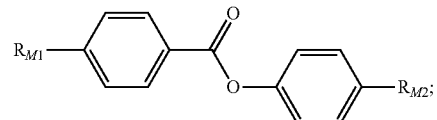
M12
M13
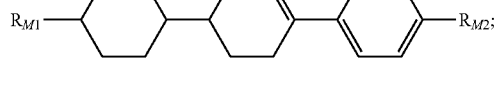
M14
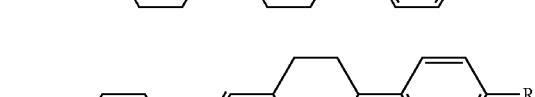
M15
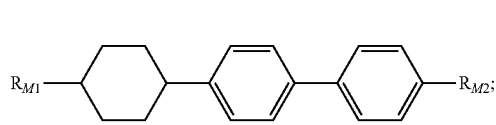
M16
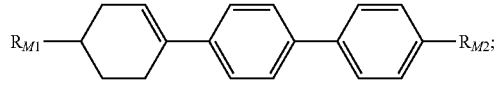
M17
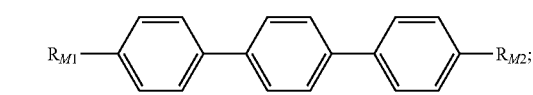
M18
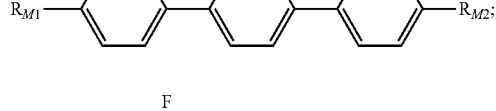
M19
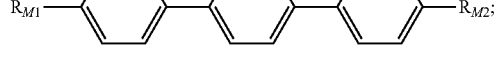
M20
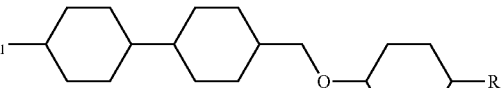
M21
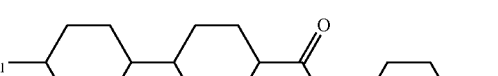
M22
-continued
M23
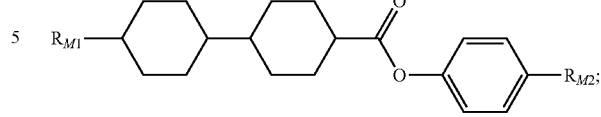
M24
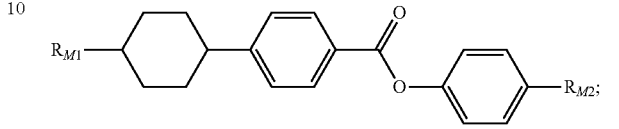
M25
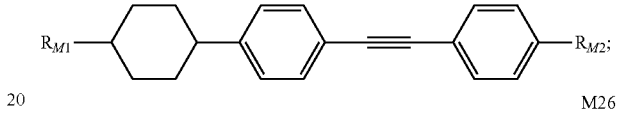
M26
M27
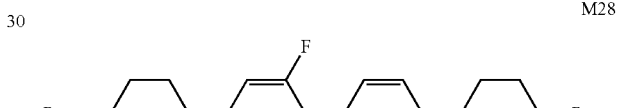
M28
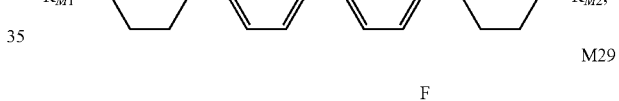
M29
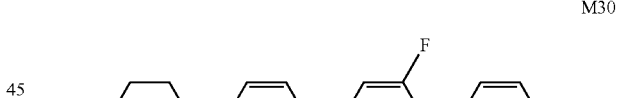
M30
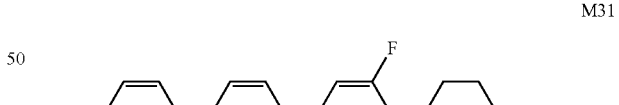
M31
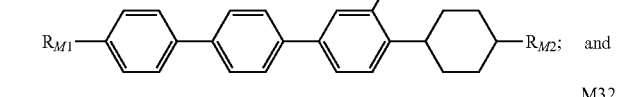; and
M32
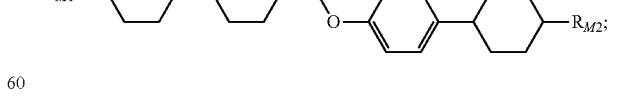
in which,
$R_{M1}$ and $R_{M2}$ each independently represents $C_{1-12}$ linear alkyl, $C_{3-12}$ branched alkyl, or one or at least two nonadjacent —$CH_2$— in the $C_{1-12}$ linear alkyl, $C_{3-12}$ branched alkyl may be respectively and independently replaced by —CH=CH— or —O—.

13. The liquid crystal composition according to claim 12, wherein:

$R_{M1}$ and $R_{M2}$ each independently represents $C_{1-10}$ linear alkyl, $C_{2-10}$ linear alkenyl or $C_{1-9}$ linear alkoxy; or the liquid crystal composition includes one or at least two compound of general formula M1 in which $R_{M1}$ and/or $R_{M2}$ is n-propyl.

14. The liquid crystal composition according to claim 9, wherein the compound of general formula N is selected from a group consisting of the following compounds:

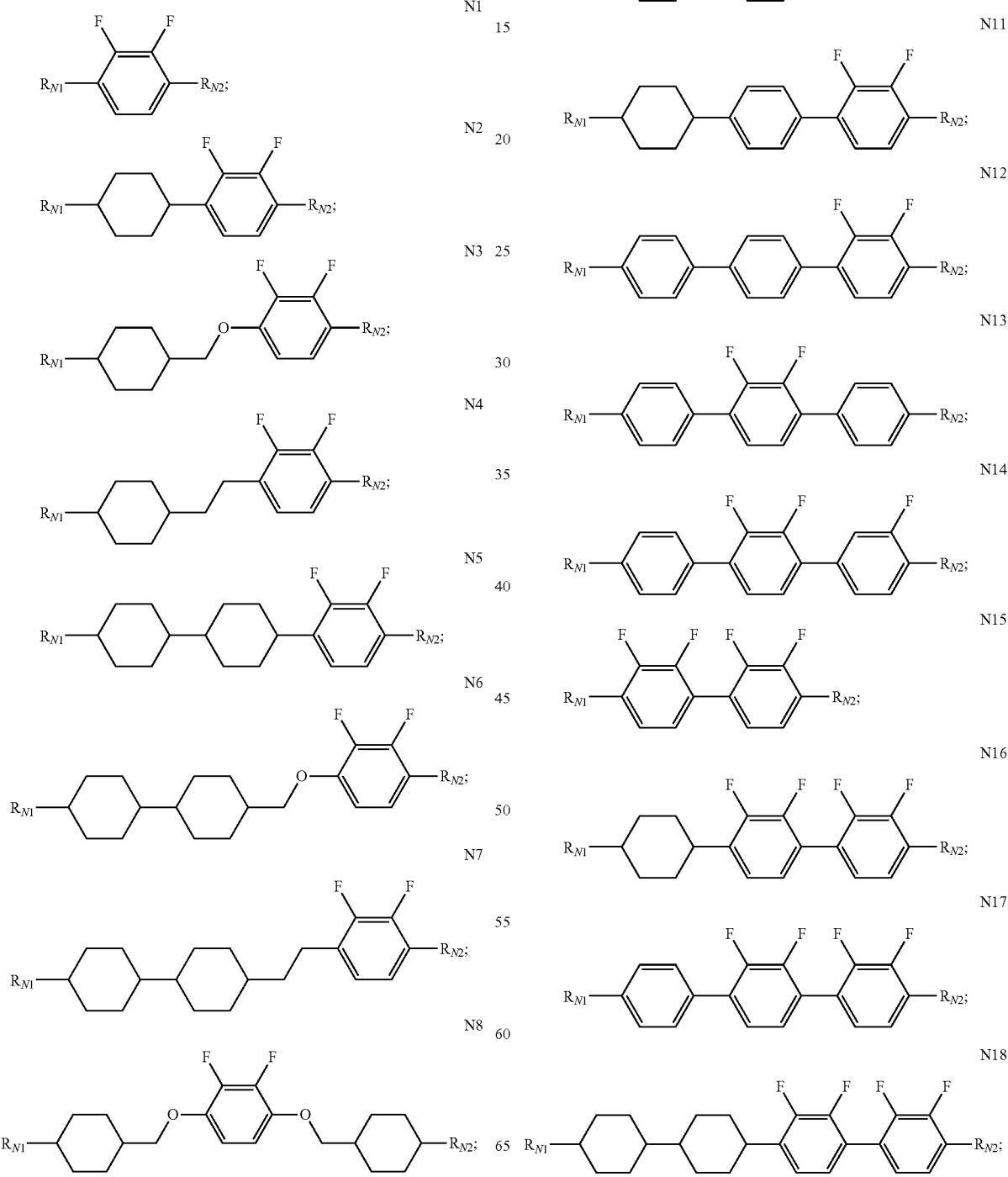

-continued
N19
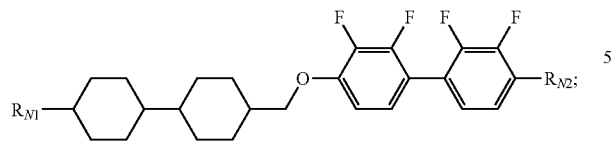
N20
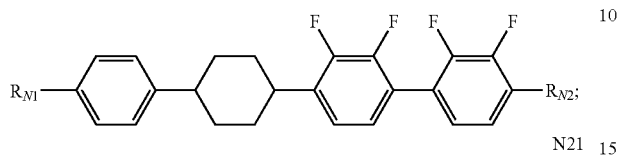
N21
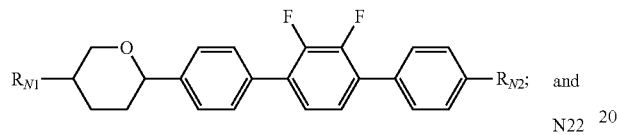
and
N22
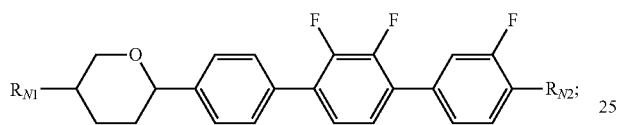
in which, $R_{N1}$ represents $C_{1-5}$ linear alkyl, $C_{3-15}$ branched alkyl, $R_{N2}$ represents $C_{1-4}$ linear alkyl, $C_{3-14}$ branched alkoxy.
* * * * *